United States Patent
Ataku et al.

(10) Patent No.: US 6,865,043 B2
(45) Date of Patent: Mar. 8, 2005

(54) DATA SET INFORMATION FOR RECOVERY OF SYNCHRONIZED DATA ON MAGNETIC TAPE

(75) Inventors: Toshimi Ataku, Sagamihara (JP); Paul Merrill Greco, Tucson, AZ (US); Hiroshi Itagaki, Yokohama (JP); Glen Alan Jaquette, Tucson, AZ (US); Hironobu Nagura, Kawasaki (JP); Toshiyuki Shiratori, Komae (JP)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 10/293,550

(22) Filed: Nov. 14, 2002

(65) Prior Publication Data

US 2003/0142429 A1 Jul. 31, 2003

Related U.S. Application Data

(63) Continuation-in-part of application No. 10/058,101, filed on Jan. 29, 2002.

(51) Int. Cl.⁷ .................................................. G11B 5/09
(52) U.S. Cl. ............................................. 360/48; 710/6
(58) Field of Search ....................... 360/48, 72.1, 72.2; 710/6, 52; 711/167

(56) References Cited

U.S. PATENT DOCUMENTS

| 4,410,942 A | 10/1983 | Milligan et al. ............ 364/200 |
| 4,435,762 A * | 3/1984 | Milligan et al. ................ 710/6 |
| 4,675,807 A | 6/1987 | Gourneau et al. ........... 364/200 |
| 5,572,378 A | 11/1996 | Schwarz et al. ............... 360/48 |
| 6,295,177 B1 * | 9/2001 | Bickers et al. ................ 360/48 |
| 6,532,128 B1 * | 3/2003 | Bui et al. ................... 360/74.1 |

FOREIGN PATENT DOCUMENTS

| EP | 324542 A2 | 7/1989 | ............. G06F/3/06 |
| WO | WO 00/23992 | 4/2000 | ........... G11B/15/18 |
| WO | 00/72323 A1 | 11/2000 | ........... G11B/27/32 |

OTHER PUBLICATIONS

"Variable IBG Mode for Tape Drive", IBM Technical Disclosure Bulletin, vol. 25, No. 6, Nov. 1982, p. 2880.

"Method for Transferring Large Amounts of Data to Streaming Tapes", IBM Technical Disclosure Bulletin, vol. 31, No. 6, 11/88, pp. 341–342.

* cited by examiner

Primary Examiner—Sinh Tran
Assistant Examiner—Dan I Davidson
(74) Attorney, Agent, or Firm—John H. Holcombe

(57) ABSTRACT

Special fields for error recovery are provided in data set information tables of data sets written with synchronized transactions. If a transaction only partially fills a data set, that data set is rewritten in a succeeding data set, appending the next transaction. A moving access point in the table identifies the appended transaction, allowing the rewritten transaction to be skipped during read recovery. The table provides recovery trails by providing a thread to tie the data sets together, the status of the data set, and pointers, such as identifying the wrap of the immediately succeeding data set.

21 Claims, 13 Drawing Sheets

DATA SET INFORMATION FOR RECOVERY OF SYNCHRONIZED DATA ON MAGNETIC TAPE

CROSS REFERENCE TO RELATED APPLICATION

The present application comprises a continuation-in-part of copending and coassigned U.S. patent application Ser. No. 10/058,101, filed Jan. 29, 2002.

FIELD OF THE INVENTION

This invention relates to storage of data to magnetic tape, and, more particularly, to storage of synchronized data, data which is to be physically written to tape before a command complete response can be made, so that the entity sending the data is able to erase its data, knowing that a copy physically exists on magnetic tape.

BACKGROUND OF THE INVENTION

Magnetic tape provides a means for physically storing data which may be archived or which may be stored in storage shelves of automated data storage libraries and accessed when required. Data stored in this manner has an aspect of permanence which allows copies of the data stored in memory or disk at a host system to be erased, knowing that a copy exists on magnetic tape. The available storage space at the host system is relatively expensive, and there is a desire to release the storage space as soon as possible. Hence, data is typically transferred through an intermediate staging buffer, such as a hard disk, to the tape drive, and there is also a desire to release and overwrite the staging buffer as soon as possible.

Thus, it is often desirable to "synchronize" the data.

"Synchronized data" is defined as data or other information which is subject to a "synchronizing event" or similar command requiring the tape drive to not return "Command Complete" to a write type of command, or an indication that the command has been or will be successfully executed, until it has actually committed the data to media, specifically, the magnetic tape. As the result, if power is lost, the data can be recovered from the tape, whereas it may not be recoverable from a volatile DRAM storage of the tape drive buffer.

One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and all data which precedes the command must be written to tape before a command complete is sent. Hence, this command is often referred to as a "Synchronize" command, as is known to those of skill in the art.

Another example of a synchronizing event is a host selectable write mode known to those of skill in the art as "non-buffered writes", where an implicit synchronize must be performed after each record is written from the host. "Command Complete" is not returned for any write command until the data is successfully written on media.

Herein, writing any data record, group of records, or other mark, is defined as a "transaction", and writing such data record, etc., as the result of a synchronizing event is defined as a "synchronized transaction".

A difficulty with respect to magnetic tape is that the data is recorded sequentially without long gaps between data sets, whereas synchronized transactions are stored in separate bursts for each synchronizing event, with a noticeable time period before writing the next transaction. This requires that the tape drive "backhitch" after writing the synchronized transaction in order to write the next transaction closely following the preceding transaction. Tape is written or read while it is moved longitudinally at a constant speed. Hence, a backhitch requires that the tape be stopped, reversed to beyond the end of the previous transaction, stopped again, and accelerated up to speed in the original direction before the next transaction can be written to the tape. As is understood by those of skill in the art, the backhitch process consumes a considerable amount of time, and, if a large number of small synchronized transactions are to be stored, the throughput of the tape drive is reduced dramatically. As an example, backhitch times can vary from about half a second to over three seconds.

Briefly, the cross referenced application, as pointed out by the abstract, writes synchronized data to magnetic tape while reducing the number of backhitches. A controller detects a pattern of synchronizing events for received data records to be written to tape; writes each transaction of data records to the magnetic tape; accumulates the synchronized transactions in a buffer; and subsequently recursively writes the accumulated transactions of data records from the buffer to the magnetic tape in a sequence. A single backhitch may be employed to place the recursively written accumulated data records following the preceding data, maximizing performance and capacity.

Should an error occur during the process, such as a power off or permanent write error, a read recovery process is needed to recover the synchronized data.

SUMMARY OF THE INVENTION

In accordance with the present invention, a recording system for a magnetic tape drive, a magnetic tape drive, and a method are provided for receiving data to be written to the magnetic tape. Fields are provided in a data set information table for each data set of the synchronized transactions for read recovery of the synchronized data.

The magnetic tape drive has at least one motor for moving a magnetic tape longitudinally; and has at least one read/write head for reading from and for writing to the magnetic tape while the magnetic tape is moved longitudinally by the at least one motor.

In one embodiment, the magnetic tape drive recording system comprises at least one recording channel receiving data to be written to the magnetic tape, the data in the form of transactions, the recording channel(s) for operating the read/write head(s) for writing transactions to the magnetic tape; and a controller operating the motor(s), and the recording channel(s).

The controller detects a pattern of synchronizing events for writing the transactions to the magnetic tape as synchronized transactions; writes the synchronized transactions to the magnetic tape as written synchronized transactions, in the form of data sets, each data set having a data set information table; and in the event one of the written synchronized transactions, or the end of a transaction, partially fills a data set, rewrites the partially filled data set in a succeeding data set, and appends a subsequent synchronized transaction in the succeeding data set as an appended synchronized transaction; and establishes a moving access point for the succeeding data set in the data set information table of the succeeding data set, the moving access point identifying the appended synchronized transaction, thereby skipping the rewritten synchronized transaction.

In a further embodiment, wherein the transactions comprise compressed information, in a read recovery of the partially filled data set and the succeeding data set, the written synchronized transaction is read and decompressed from the partially filled data set, the rewritten synchronized transaction of the succeeding data set is skipped due to the moving access point, and the appended synchronized transaction is read and decompressed from the succeeding data set.

In a still further embodiment in which the magnetic tape has a plurality of wraps; the controller writes the synchronized transactions to work copy wraps of the magnetic tape, likely in the form of spaced apart data sets, each data set having a data set information table. Data set information tables are additionally provided for data sets of subsequently recursively written synchronized transactions, which are copies of the synchronized transactions written to the magnetic tape in a sequence of data sets.

The controller provides, in the data set information table of each data set for the synchronized transactions, a number representing a thread for the synchronized transactions of the detected pattern; provides the status of the data set; and provides an identification of the wrap of the immediately succeeding data set of the synchronized transactions, if any, as a forward pointer. The controller additionally provides, for the recursively written synchronized transactions, a backwards pointer to a longitudinal position on the magnetic tape of a written work copy data set. As an example, the pointer is to the next work copy synchronized transaction data set to be recursively written.

Thus, the thread, the status, and the forward and backwards pointers provide trails for aiding in a read recovery process.

In another embodiment, the controller initially writes at least one data set of the synchronized transactions to the magnetic tape as a normal wrap data set before switching to the work copy wraps, the data set also having a data set information table. The controller provides the status of the normal wrap data set in the data set information table, identifying in the status, the last normal wrap data set. Additionally, the number representing a thread for the synchronized transactions of the detected pattern, comprises the write pass number of the last data set having a transaction of the pattern written to the magnetic tape as a normal wrap data set, and before the work copy synchronized transaction data sets are written.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
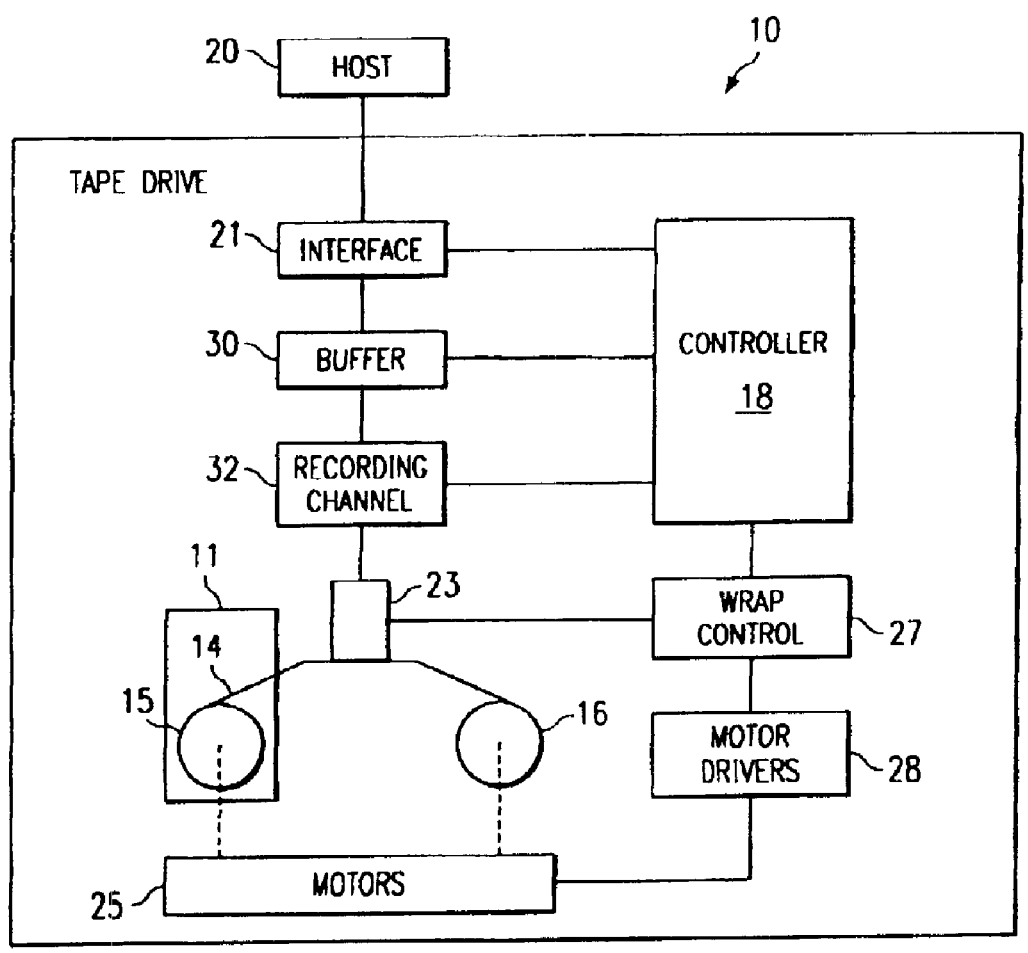
FIG. 1 is a block diagram of a magnetic tape drive with a magnetic tape cartridge which tape drive may implement the present invention.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM 3580 Ultrium magnetic tape drive based on LTO technology. A further example of a single reel tape drive and cartridge is such as that discussed in U.S. Pat. No. 5,432,652, Comeaux et al., issued Jul. 11, 1995. Another example of a single reel tape drive is the IBM 3590 Magstar magnetic tape drive and associated magnetic tape cartridge. An example of a dual reel cartridge is the IBM 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 of a recording system for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more read and/or write heads 23 of the recording system reads and/or writes information with respect to the magnetic tape 14 as the tape is moved longitudinally by one or more motors 25. The magnetic tape comprises a plurality of parallel tracks, or groups of tracks. In some formats, such as the LTO format, discussed above, the tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatting of data to be read from and written to the magnetic tape, employing a buffer 30 and a recording channel 32, as is known to those of skill in the art.

As discussed above, magnetic tape provides a means for physically storing data which may be archived or which may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, knowing that a correct copy exists on magnetic tape.

The available storage space at the host system is relatively expensive, and there is a desire to release the storage space as soon as possible. Hence, data is typically transferred through an intermediate staging buffer, such as a hard disk, to the tape drive, and there is also a desire to release and overwrite the staging buffer as soon as possible. In the instant example, the staging buffer, if any, is considered to comprise part of the host system 20.

In order to release the staging buffer, it is necessary to have an assurance that the data has actually been recorded on the magnetic tape 14, and is not just in a volatile DRAM storage, such as buffer 30, and may be lost if power to the buffer or to the drive is lost. Thus, it is often desirable to "synchronize" the data, requiring the tape drive to not return "Command Complete" to a write type of command, or an indication that the command has been or will be successfully executed, until it has actually committed the data to media, specifically, the magnetic tape 14. Once the data has been written to the magnetic tape, if power is lost, the data can be recovered from the tape, whereas it may not be recoverable from a volatile DRAM storage of the tape drive buffer.

Various examples of synchronizing events which have the effect of synchronizing the data are known to those of skill in the art. One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and the only meaning of the command is that all data which precedes the command must be written to tape before a command complete is sent. Another example is a host selected non-buffered write mode implicitly requiring a synchronize for each record.

Figure 2:
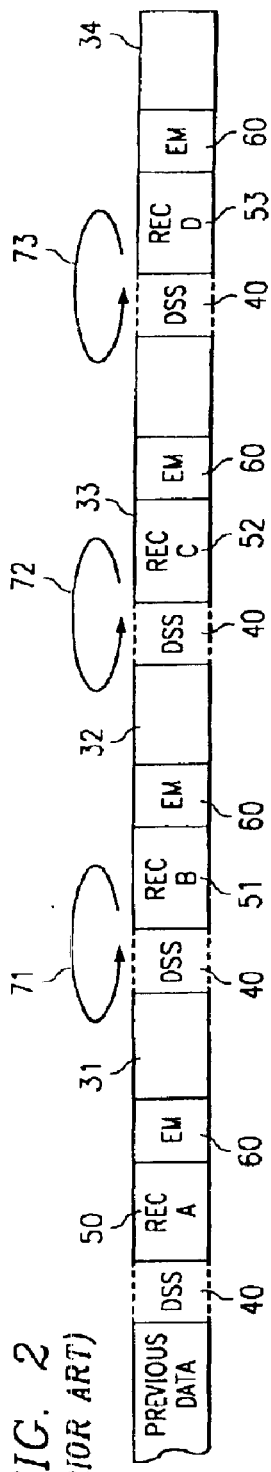
FIG. 2 is a diagrammatic illustration of synchronized data written on a magnetic tape employing the prior art methodology with backhitches.

Referring to FIG. 2, data is typically recorded on magnetic tape sequentially with only short gaps between data sets, for example between data sets 31 and 32, 32 and 33, etc. These gaps may be written with an Interblock Gap (IBG) pattern, or may comprise a Data Set Separator (DSS) pattern 40, as is known to those of skill in the art. The gap may comprise an actual unrecorded portion and a portion that is recorded. For example, the LTO format DSS comprises a tone pattern between data sets. As discussed above, the tape is written or read while motors 25 of FIG. 1 move the tape longitudinally. Data typically comprises a string of records arranged in data sets, each with a DSS, which are written with nominal spacing. Only occasionally, typically when the buffer is empty, is the tape stopped.

However, if the data is synchronized, it must be immediately written to tape from the buffer, and only after the synchronized transaction has been written to tape is the transaction erased from the buffer and overwritten, such that it cannot be the subject of a continuous data flow. Hence, synchronized transactions instead must be written immediately in separate bursts for each synchronization event. As the result, after one data set is written for a synchronized transaction, in the prior art of FIG. 2, to insure that the data sets are closely spaced, the controller 18 of FIG. 1 typically operates the servo system and motor drivers to stop the tape after the data set. Some finite distance and finite time is required to stop the tape, and the tape is then "backhitched", reversed to beyond the end of the previous data set, stopped again, and accelerated up to speed in the original direction before the DSS and the next data set may be written to the tape. As is understood by those of skill in the art, the backhitch process consumes a considerable amount of time.

Thus, if a large number of synchronized transactions are to be stored, the throughput of the tape drive is reduced dramatically. As an example, backhitch times can vary from about half a second to over three seconds each.

In the example of FIG. 2, records 50–53 are synchronized. Typically, a transaction will comprise hundreds of records, but only transactions of one record each are illustrated for descriptive purposes herein. If a transaction comprised of a record, or group of records, ends in the middle of a data set, then an End Marker (EM) is written to signal that the remainder of that data set is empty. Typically, each synchronized transaction is formatted as a separate data set, and is illustrated in FIG. 2 as data records 50–53 in data sets 31–34. Thus, the prior art process requires that the tape drive 10 backhitch (shown by arrow 71) after writing data set 31 (to synchronize transaction record 50), to be positioned to write data set 32 with a minimum amount of DSS pattern in between; to backhitch 72 after writing data set 32 to synchronize transaction record 51, and write data set 33; etc. The process continues until all of the synchronized data has been written.

Figure 3:
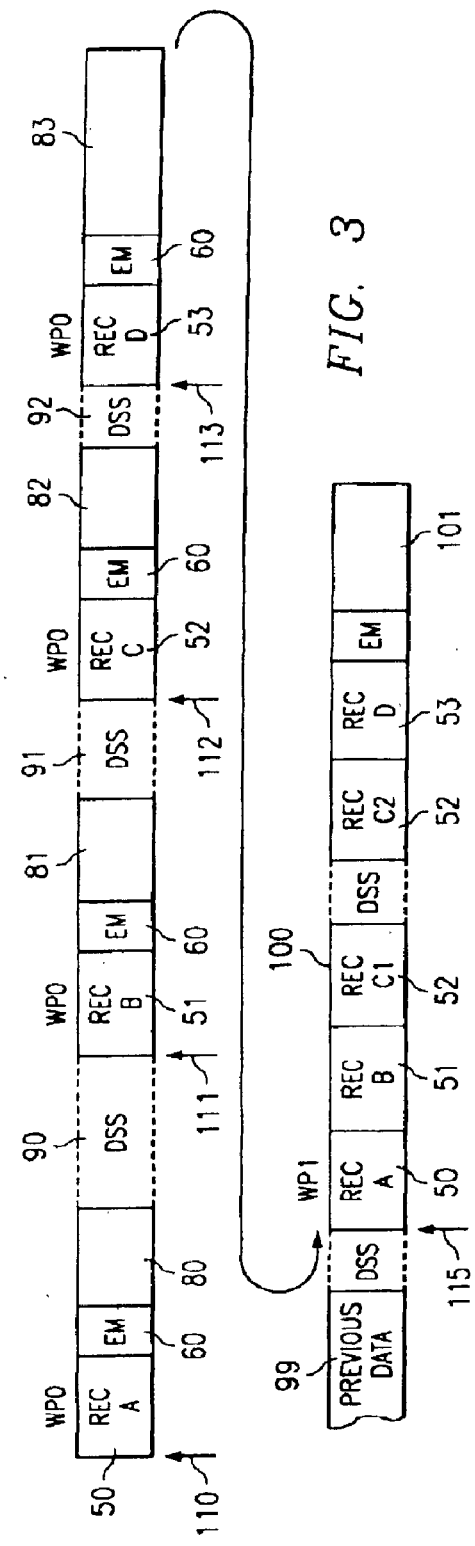
FIG. 3 is a diagrammatic illustration of synchronized data written on magnetic tape employing one embodiment of the present invention.

FIGS. 1 and 3 illustrate embodiments of the present invention for reducing the number of backhitches for the synchronized data.

In one embodiment, the recording system for a magnetic tape drive, e.g., magnetic tape drive 10 of FIG. 1, comprises at least one buffer 30 for storing data in the form of data transactions to be written to magnetic tape 14, at least one recording channel 32 coupled to the buffer for operating at least one read/write head 23 for writing transactions from the buffer to the magnetic tape, and at least one controller 18.

In one aspect of the present invention, the controller 18 detects a synchronized received transaction, e.g., transaction record 50 of FIG. 3, stored in the buffer 30; writes the detected synchronized transaction record 50, with EM 60, from the buffer to the magnetic tape as data set 80; continuing the gap with or without separator signals 90 until a subsequently received synchronized transaction 51 (data set 81) is written to the magnetic tape following the separator signals, and this may leave an elongated gap which comprises an unrecorded gap and/or written separator signals 90 (e.g., DSS) to the magnetic tape following the written synchronized transaction record 50 (data set 80); and repeats the detection of a synchronized received transaction (e.g., record 51), writing the detected synchronized transaction (as data set 81), and writing the gap of separator signals (e.g., separator signals 91), etc., for each succeeding detected synchronized received transaction, such that the tape is moved longitudinally during the repeated writing without stopping. Thus, there is no backhitch, the tape drive continues to write the synchronized transactions without stopping.

To complete the example of FIG. 3 for the four illustrated synchronized transaction records 50–53, the next synchronized received transaction 52 is detected, and is written as data set 82, and the gap separator signals (e.g., separator signals 92) are typically written for some or all of the distance until the next detected synchronized received transaction 53 is written as data set 83, etc.

Thus, in this aspect of the present invention, no backhitch is required, saving considerable processing time for completing the process for writing all of the synchronized data.

In another embodiment of the present invention, also illustrated by FIGS. 1 and 3, space on the magnetic tape is saved by recursively writing the synchronized data. To preserve the synchronized transactions 50–53 in the event that power is lost, the data sets 80–83 are considered as work copies of the transactions. Once the transactions have been recursively rewritten, the work copies may be overwritten.

First, the controller 18 detects a pattern of synchronized transactions to be written to the magnetic tape 14. A pattern may comprise a predetermined number of consecutive synchronized transactions of less than a certain length. As one example, a pattern may comprise two consecutive synchronized transactions, each having a length less than that of a data set or some threshold. As discussed above, the typical synchronized transaction is written to tape, and then the transaction is erased from the host system with the assurance that the transaction has been written and will not be lost even as the result of a power loss. Additionally, the data will not be lost even in the event of a subsequent permanent write error preventing recursive rewrite.

In accordance with the present invention, the controller 18 writes each detected synchronized transaction, illustrated as a record 50–53, of the detected pattern from the buffer to the magnetic tape 14, e.g., as data sets 80–83, above. Previous synchronized transactions of the detected pattern may be excluded, having already been written in the manner discussed above before the pattern is detected. Thus, in FIG. 3, the previous synchronized transactions may comprise the previous data 99. Upon writing each synchronized transaction of the detected pattern from the buffer to the magnetic tape, the controller accumulates the synchronized transaction in the buffer 30; and subsequently recursively writes the accumulated transactions from the buffer to the magnetic tape in a sequence, e.g., illustrated as data sets 100, 101. The recursive writing may comprise a backhitch to place the recursively written accumulated transactions following the preceding data 99 with the nominal gap.

Thus, the synchronized transactions 50–53 have been immediately written to the magnetic tape 14, and preserved against a power loss at the buffer 30, as work copies in data sets 80–83, while also being accumulated in buffer 30, and then recursively written to immediately follow the preceding data 99 in data sets 100, 101, saving space. Once the transactions have been recursively written, the work copies 80–83 may be overwritten.

The point at which the accumulated synchronized data is recursively written may comprise the termination of the pattern of synchronously written transactions, may comprise a predetermined threshold, such as the limit of capacity of the buffer 30 to accumulate data records, or may comprise the limit of capacity on tape for the work space which holds work copies 80–83 and their separation signals 90–92.

In the embodiment of FIG. 3, the controller separately writes each synchronized transaction 50–53 from the buffer to the magnetic tape, in the example as data sets 80–83, and identifies each separately written synchronized transaction, for example, by means of an access point 110–113. Access points are a means under the LTO format for designating the beginning of a valid current data record or records, and are typically at the beginning of a data set.

The controller additionally identifies the recursively written transactions as the most current copy thereof, employing a new access point 115, superseding the identified separately written synchronized transactions of the data sets 80–83. Alternatively or additionally, the write pass indication "WP" for each data set may be incremented to indicate that the recursively written transactions are each the most recent copy, superseding the identified separately written synchronized transactions of the data sets 80–83. Both access points and write pass procedures are within the LTO format, as is known to those of skill in the art. The modification of the access points in accordance with the present invention is discussed hereinafter. As the result, should power be lost before the work copies 80–83 are overwritten, examination of the access points and/or write pass indicators will allow a correct recovery of data contained therein to be made.

Figure 4:
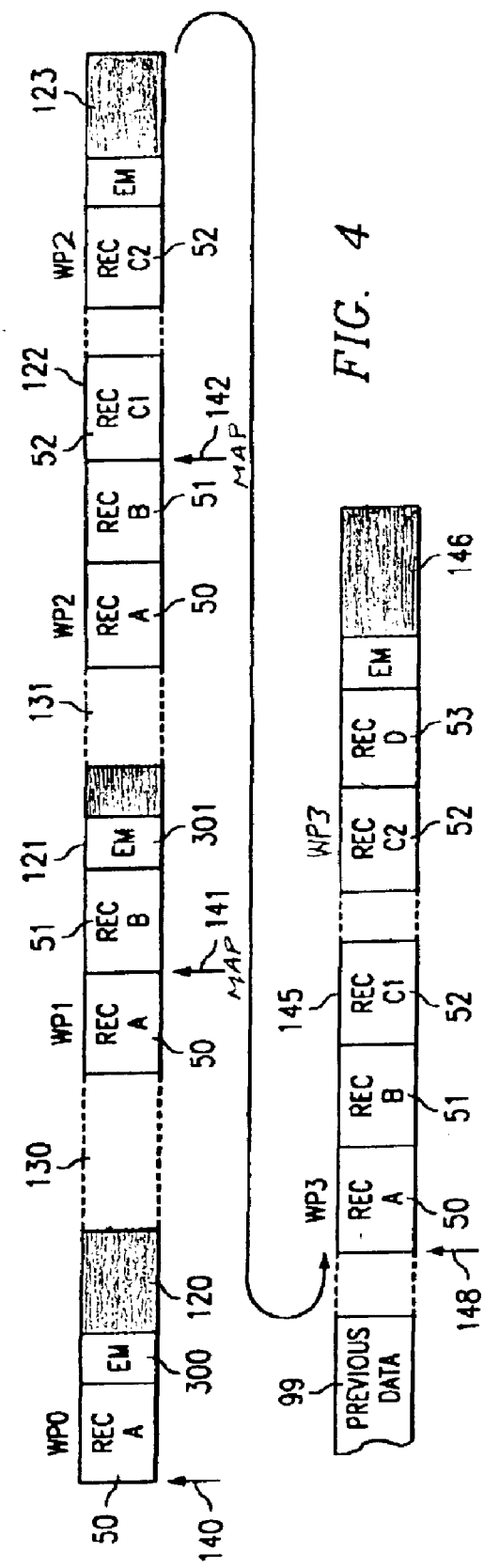
FIG. 4 is a diagrammatic illustration of synchronized data written on magnetic tape employing an alternative embodiment of the present invention.

An alternative embodiment of the present invention is illustrated in FIG. 4, wherein the controller writes each synchronized transaction 50–53 of the detected pattern of synchronizing events from the buffer to the magnetic tape by writing data sets of transactions, and, for any partial data set that was not filled upon writing a transaction, rewriting the partial data set and appending the next synchronized transaction that is being written. The partial data set is obtained from the data accumulated in the buffer 30 of FIG. 1. Thus, a transaction of one or more records, shown as record 50, is written separately in data set 120, followed by an End Marker 300 as comprising a partial data set. Then, the DSS 130 is written, and the transaction is accumulated in buffer 30. The subsequent transaction 51 is appended to the accumulated transaction 50 in data set 121 which is written, causing transaction 50 (or the last part of transaction 50 if it includes previous data sets) to be rewritten and the appended transaction 51 to be written to tape, so that there is a concentration of the transactions. As data set 121 is also a partial data set, End Marker 301 is written, and the data set 121 is followed by DSS 131, and transaction 51 is accumulated in the buffer. The process continues as the subsequent transaction 52 is appended to the accumulated transactions 50 and 51 of the partial data set, and the rewritten accumulated transactions 50, 51 and the synchronized transaction 52 are written as data sets 122 and 123, etc. Once a data set has been filled, it is again rewritten, such as data set 122, and, after that filled data set is written once, it does not need to be written again on the work wraps.

In accordance with the present invention, a moving access point identifies a synchronized transaction appended to a rewritten synchronized transaction, thereby allowing skipping the rewritten synchronized transaction in a read recovery process, as will be discussed.

The rewritten and appended written synchronized transaction is identified as the most current copy thereof, for example by means of an incremented write pass "WP" for the data set, as discussed above.

Subsequently, upon recursively writing the data sets, the controller additionally identifies the recursively written transactions as the most current copies thereof, for example by further incrementing the write pass "WP" for the data sets, superseding the written and/or identified rewritten and appended written synchronized transactions.

For example, the write pass indicator of data set 121 for transaction 50, when rewritten for the first time, is incremented to "WP1", and the write pass indicator for data set 122 in which transaction 50 is rewritten a second time, is incremented to "WP2". The controller then recursively writes the transactions 50–53 as data sets 145 and 146. The controller additionally identifies the recursively written transactions as the most current copy thereof, incrementing the write pass for the data set 145 containing transaction 50 an additional time to "WP3", and incrementing the write pass for the data set 146 containing part of the rewritten transaction 52 to "WP3". Again, as the result, should power be lost before the work copies 120–123 are overwritten, examination of the write pass indicators will allow a correct recovery to be made.

Alternatively, FIG. 4 represents a further alternative embodiment of separately writing each of the synchronized transactions discussed above, in that the write pass indicator need not be updated. Instead, the active copy of the transaction is indicated by an access point 140–142. In accordance with the resent invention, access points 141 and 142 are moving access points which identify a synchronized transaction appended to a rewritten synchronized transaction, thereby allowing skipping the rewritten synchronized transaction in a read recovery process, as will be discussed. Thus, transaction 50 is indicated by access point 140, transaction 51 is indicated by a moving access point 141, etc. The controller recursively writes the transactions 50–53 as data sets 145 and 146, and additionally identifies the recursively written transactions as the most current copy thereof, employing an access point 148, superseding the identified separately written synchronized transactions of the data sets 120–123.

Figure 5:
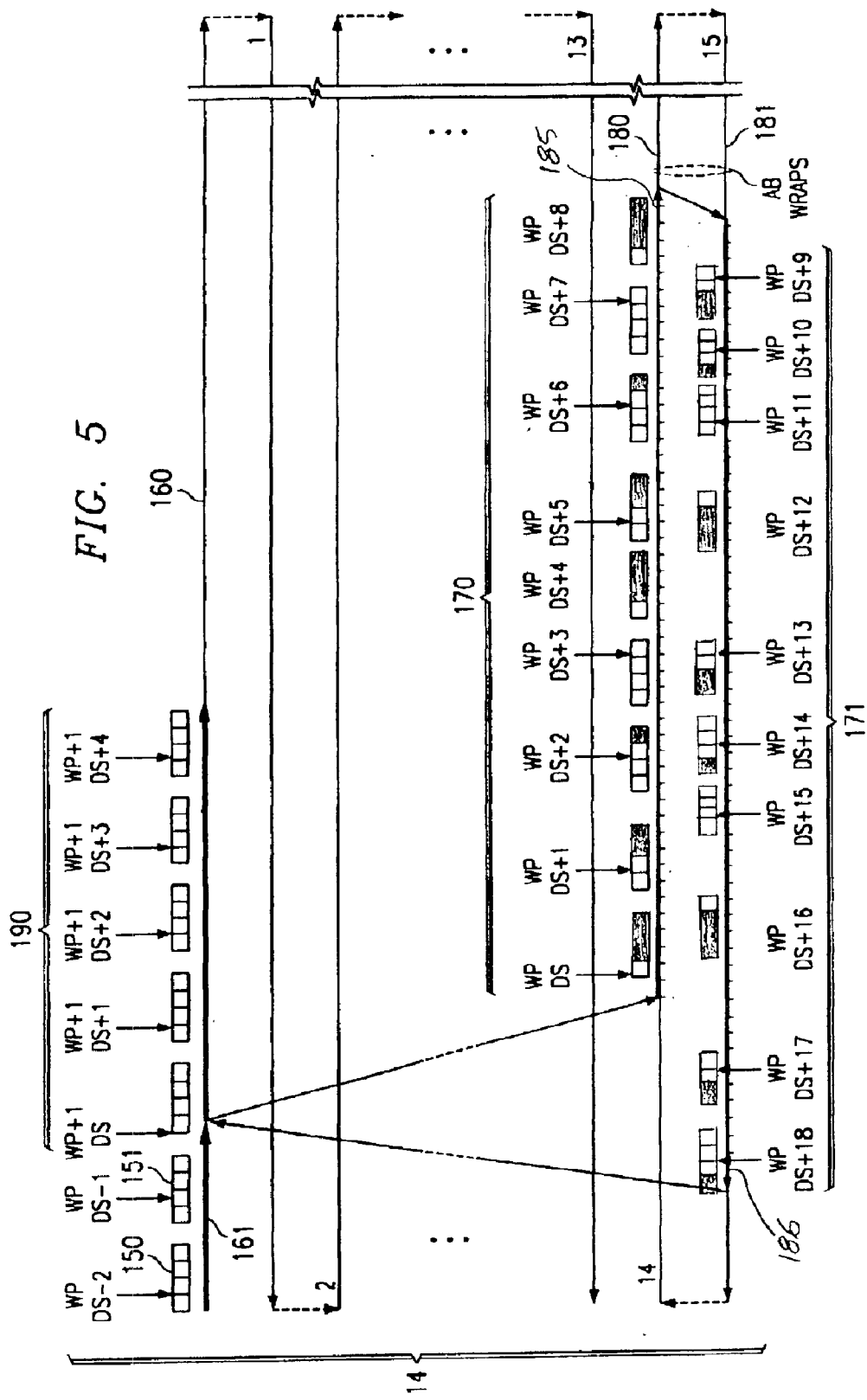
FIG. 5 is a diagrammatic illustration of synchronized data written on magnetic tape having a plurality of wraps, and employing separate accumulating backhitchless wraps for storing a work copy in accordance with an embodiment of the present invention.

Referring to FIG. 5, in still another embodiment, where the magnetic tape comprises a plurality of wraps, such as in an LTO system as discussed above, the controller 18 of FIG. 1 writes the work copies of at least some of the synchronized transactions of the detected pattern on at least one of the plurality of wraps that is separate from the wrap to which it will be recursively written. Thus, a good working copy is fixed on the tape before the final set of transactions in the example, are recursively written.

Specifically, in the example, the pattern of synchronously written transactions is detected after data sets 150 and 151 have been written on standard wrap 160 in the direction of arrow 161. The controller operates the wrap control system 27 of FIG. 1 to electronically switch read/write heads, or to conduct a seek and reposition the tape head 23 to a set of work copy wraps, such as accumulating backhitchless wraps 180 and 181.

In one embodiment, the controller 18 designates a plurality of wraps of the magnetic tape 14 as work copy wraps 180, 181, and, upon detecting a pattern of synchronizing events, determines whether access to the work copy wraps requires a seek, or may be conducted electronically, switching to a different set of read/write heads. If a seek is required in which the head is moved laterally of the wraps, the controller 18 selects a work copy wrap having the quickest seek. As an example, the quickest seek may be to the closest available work copy wrap.

In another embodiment, once a work copy wrap has been selected, the controller 18 determines the present longitudinal position of the read write head along the tape, and determines the writable space of the selected work copy wrap in each longitudinal direction from that present longitudinal position. The controller then operates the motors 25, the wrap control 27 and the read/write head to begin writing the synchronized transactions in the longitudinal direction of the selected work copy wrap having the greatest writable space.

In the example, the work copies 170–171 are then written on the accumulating backhitchless wraps 180 and 181, first in the direction of arrow 185, and then in the direction of arrow 186. In the example, the work copies are written in the manner of separately writing the synchronized transactions by appending, and employing the access points, while ignoring the rewritten data records, all as illustrated in FIG. 4. The reversal of direction between that of arrow 185 to that of arrow 186 provides a reduced distance for the backhitch process, and, accomplishes one reversal of the backhitch. The reversal point for switching direction of writing the work copies from the direction of arrow 185 to that of arrow 186 may comprise the point at which the buffer 30 of FIG. 1 is about half full of accumulated synchronized transactions. Various algorithms may be employed to determine the reversal point for switching the direction of writing the work copies. The goal of any such algorithm is to reach the original append point (to recursively write the transactions) when the buffer is full of accumulated synchronized transactions.

The controller operates the wrap control system 27 of FIG. 1 to access the tape head 23 to the standard wrap and the synchronized transactions are then recursively written from the buffer to the standard wrap 160 immediately after the preceding data set 151 in the direction of arrow 161, shown as data sets 190. The work copies 170–171 may then be overwritten.

Embodiments of the method of the present invention are illustrated in FIGS. 6–11.

Referring to FIGS. 1, 3, 4 and 6, in step 200, data is received at interface 21 and, in step 201, is stored in buffer 30. Step 203 detects whether the data is accompanied by or followed by a synchronizing event, such that the transaction is to be synchronized. If not, the data is written to the magnetic tape 14 employing a normal algorithm in step 205, for example, writing the data at a time selected by the tape drive, typically to maximize streaming, which may entail delaying the start of writing, in sequence, each data set separated from the previous data set by a DSS.

Upon detection of a synchronizing event at step 203, step 204 kicks off a check at connector 206 to detect a pattern of synchronizing events as will be discussed, and proceeds at step 207. In step 207, the synchronized transaction is written to tape, either as part of the pattern as will be discussed, or as a single transaction. Step 208 determines whether the end of data for the transaction has been reached and, if not, cycles back to step 207 to continue writing the data. Once the end of data for, the transaction is sensed and the data has been written to tape in steps 207 and 208, in step 210 the controller 18 signals command complete. Thus, the host system 20 may release the staging buffer or other source of the data. As an example, in FIG. 3, the detected synchronized data record or records 50, with EM 60, is written from the buffer to the magnetic tape as data set 80, and in FIG. 4 as data set 120.

In step 211, the controller 18 leaves a gap and/or writes separator signals (e.g., DSS) to the magnetic tape following the written synchronized data record 50 (in FIG. 3 separator signals 90 following data set 80, in FIG. 4 separator signals 130 following data set 120), continuing the gap and/or separator signals 90, 130 until, as determined by step 212 and steps 203 and 205 or 207 cause a subsequently received transaction 51 (data set 81 in FIG. 3, data set 121 in FIG. 4) to be written to the magnetic tape following the separator signals. The process of FIG. 6 thus repeats the detection of synchronized received transactions (e.g., illustrated as record 51), writing the detected synchronized transactions (as data set 81, 121), and writing the gaps and/or separator signals (e.g., separator signals 91, 131), etc., for each succeeding detected synchronized received transaction, such that the tape is moved longitudinally during the repeated writing without stopping. Thus, there is no backhitch, and the tape drive continues to write the transactions without stopping except to reverse directions in the accumulating backhitchless flush wraps, if necessary, along with a seek to a second accumulating backhitchless flush wrap.

Figure 7:
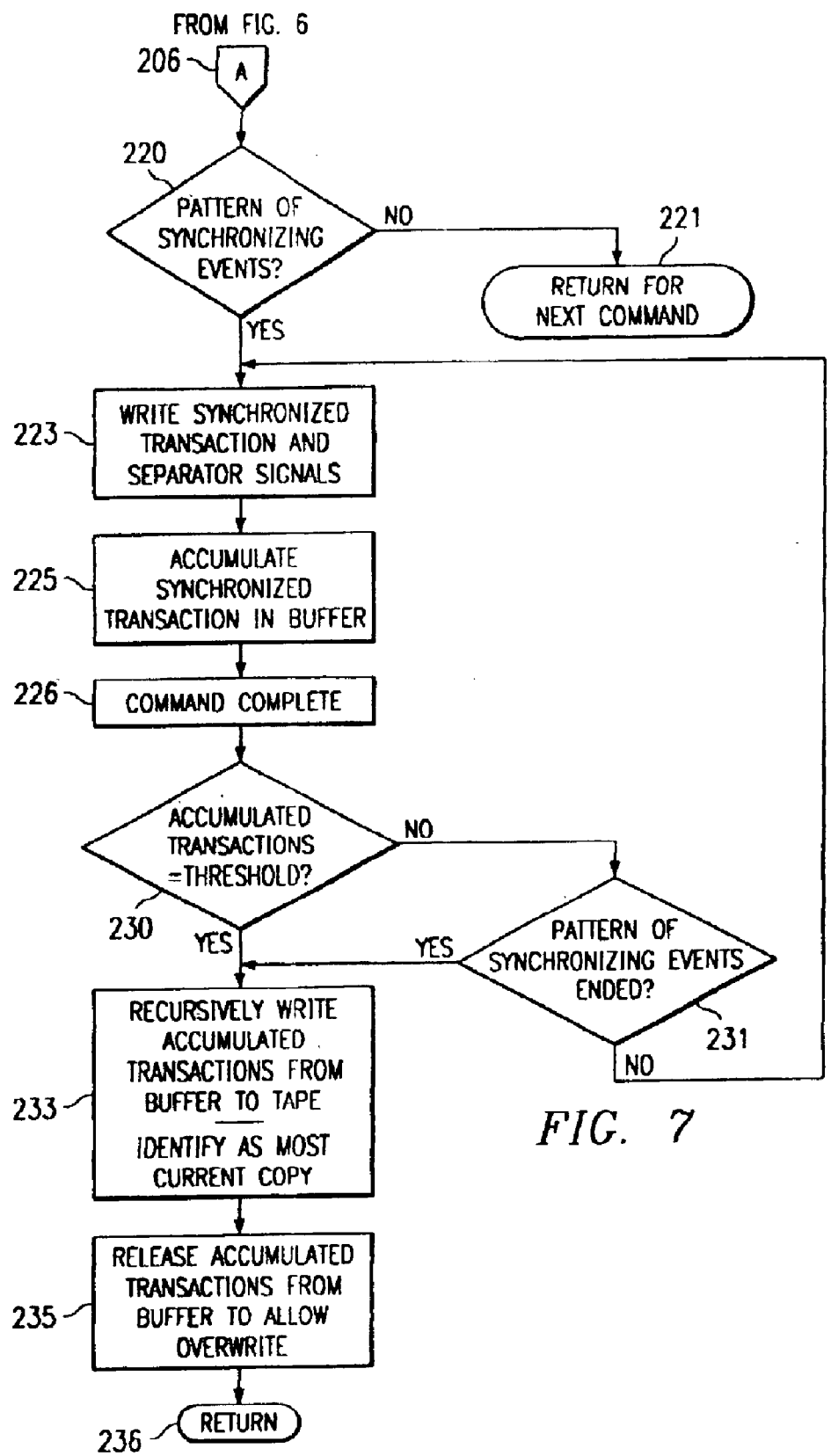
FIG. 7 is a flow chart depicting an embodiment of the method of the present invention for accumulating synchronized data for recursively writing the data.

Connector 206 leads to FIG. 7. Referring to FIGS. 1, 3, 4 and 7, space on the magnetic tape is saved by recursively writing the synchronized data. To preserve the transactions 50–53 in the event that power is lost, the data sets 80–83 are considered as work copies of the transactions. Once the transactions have been recursively written, the work copies may be overwritten.

First, in step 220, the controller 18 detects a pattern of synchronizing events for transactions to be written to the magnetic tape 14. As discussed above, a pattern may comprise a predetermined number of consecutive synchronizing events for transactions of less than a certain length. The pattern may not appear as a sequence of synchronize commands or explicit write mode, but may appear implicitly as a sequence of emptied buffer events. If there is no such pattern, the controller, in step 221, returns for the next command.

Figure 6:
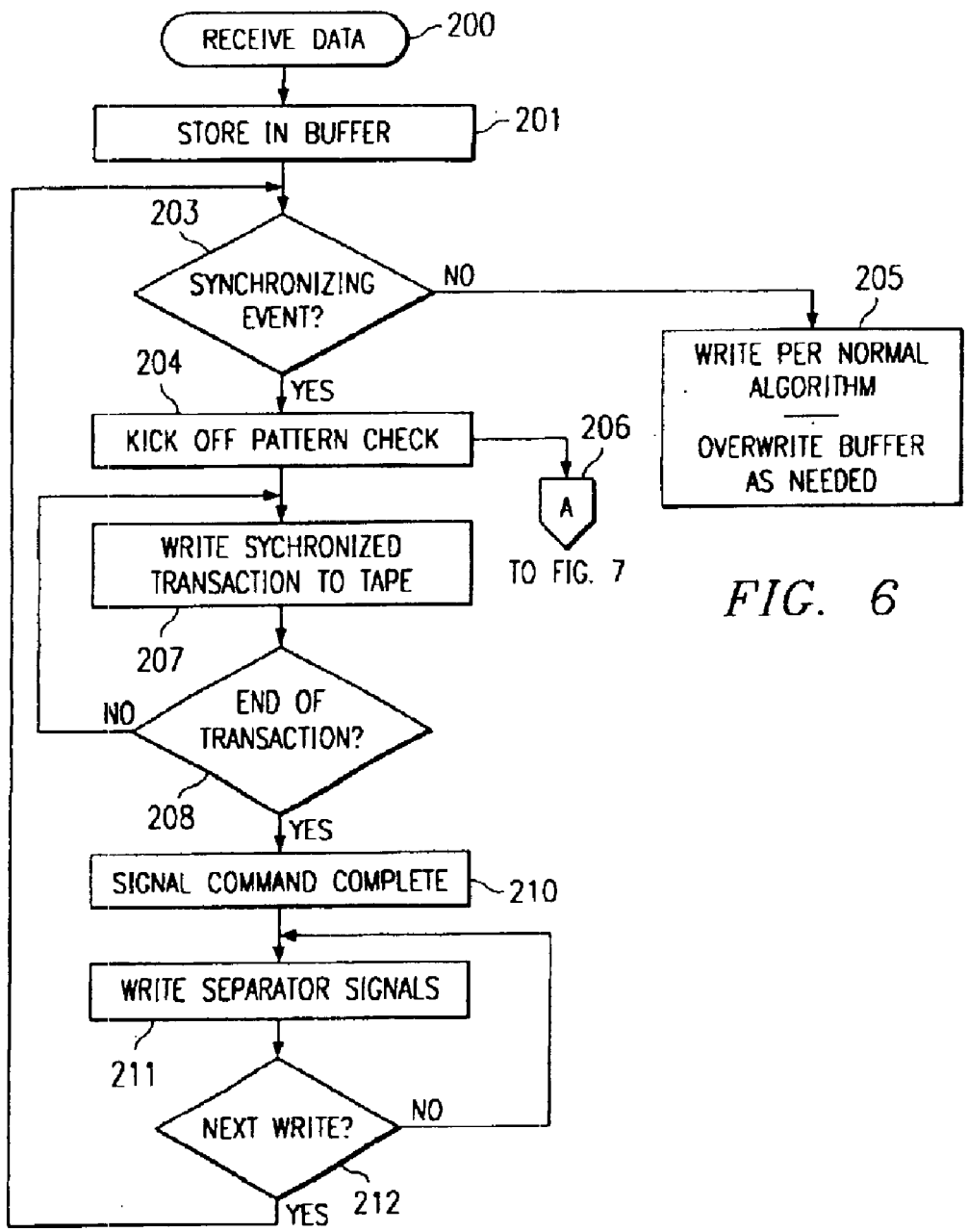
FIG. 6 is a flow chart depicting an embodiment of the method of the present invention for backhitchless writing of synchronized data.

In accordance with the present invention, upon detecting a pattern of synchronizing events in step 220, the controller 18, in step 223, separately and completely writes each detected synchronized transaction 50–53 of the detected pattern from the buffer to the magnetic tape 14, in the manner of the process of FIG. 6, with the gaps and/or separator signals following the data sets. As discussed above, the early synchronized transactions of the detected pattern may be excluded, having already been written in the manner discussed above before the pattern is detected, or before switching to the work copy wraps. Thus, in FIG. 3, and in FIG. 4, the early synchronized transactions may comprise the previous data 99.

In step 225, upon writing each synchronized transaction from the buffer to the magnetic tape, the controller accumulates the synchronized transaction in the buffer 30, providing a command complete in step 226.

Step 230 determines whether the accumulated transactions have reached a predetermined threshold. As discussed above, examples of predetermined threshold may comprise the limit of capacity of the buffer 30 to accumulate transactions, or may comprise the limit of capacity of the work space for the work copies 80–83 and their separation signals 90–92. If the threshold has not been reached, step 231 determines whether the pattern of synchronizing events has ended. If the pattern is continuing, the process cycles back to step 223 to write the next synchronized transaction.

Upon either the accumulated transaction threshold being reached in step 230, or upon reaching the end of the pattern of synchronizing events in step 231, in step 233, the controller recursively writes the accumulated transactions from the buffer to the magnetic tape in a sequence, e.g., illustrated as data sets 100, 101 in FIG. 3 or as data sets 145 and 146 of FIG. 4, and identifies the recursively written copies as the most current, e.g., employing the access point 115 of FIG. 3, the write pass indicators of FIG. 4, or the access point 148 of FIG. 4. The recursive writing may comprise a backhitch to place the recursively written accumulated transactions following the preceding data 99.

Since the data has been recursively written to tape, the work copies are no longer required, and the copies in the buffer are no longer required. Hence, in step 235, the accumulated transactions are released to allow this section of the buffer to be overwritten, as is known to those of skill in the art. In step 236, the controller returns to other processing, such as step 200 of FIG. 6.

As discussed above, the purpose of "synchronizing" data is, in order to release the staging buffer, to have an assurance that the data has actually been recorded on the magnetic tape 14, and is not just in a volatile DRAM storage, such as buffer 30, and thereby insure that the data will not be lost if power to the buffer or to the drive is lost. If the data is "synchronized", the tape drive is required to not return "Command Complete" to a write type of command, or an indication that the command has been or will be successfully executed, until it has actually committed the data to media, specifically, the magnetic tape 14. Once the data has been written to the magnetic tape, if power is lost, the data can be recovered from the tape, whereas it may not be recoverable from a volatile DRAM storage of the tape drive buffer. Additionally, the data will not be lost even in the event of a subsequent permanent write error preventing recursive rewrite.

In accordance with the present invention, information is provided in a data set information table of each synchronized transaction data set that allows efficient read recovery of the data.

Figure 12:
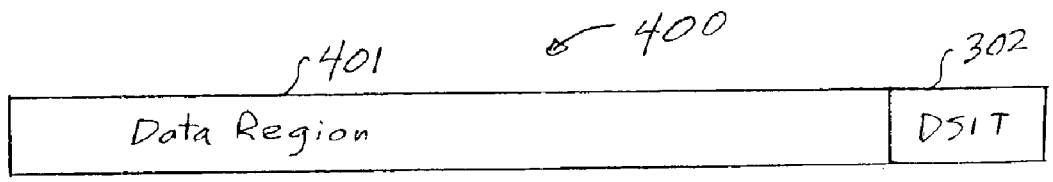
FIG. 12 is a diagrammatic illustration of a data set for synchronized data.

Referring to FIG. 12, an embodiment of a data set 400 for synchronized transaction data is illustrated. Data sets may, but not necessarily, comprise a uniform length to simplify data handling. The largest portion of a data set comprises a data region 401. As discussed above, the data region is typically filled with data, but, in some instances, the active data is terminated with an "End Mark". In nearly every instance, the data of the data region 401 has been processed by a compression algorithm which may have multiple schemes and allow incompressible data to be passed through with minimal expansion. In order to read the data, the compressed data is read from the magnetic tape, and must subsequently be decompressed.

In the illustrated embodiment, the data set 400 is terminated with an uncompressed data set information table 302.

Data set information tables are typically employed to describe the content of the data region. In accordance with the present invention, special fields are provided in the data set information tables for data sets of synchronized transactions for read recovery. In one example, upon a synchronized transaction partially filling a data set, and the partially filled data set rewritten in a succeeding data set with an appended synchronized transaction, a moving access point in the table of the succeeding data set identifies the appended synchronized transaction, thereby skipping the rewritten transaction. In another example, each data set information table provides a thread for the synchronized transactions, provides the status of the data set within the sequence of the synchronized transaction process, and identifies the wrap of the immediately succeeding data set of the synchronized transactions, to provide a recovery trail. In still another example, the data set information table of a recursively written synchronized transaction provides a backwards pointer to a longitudinal position on the magnetic tape of a written work copy data set.

To aid in the recovery process, in data sets of uniform size, the data set information table may also be of a uniform size, and may be at a known location in the data set, e.g., at the end. Thus, in recovery, the controller conducting the recovery knows specifically where to find each data set information table.

Figure 13:
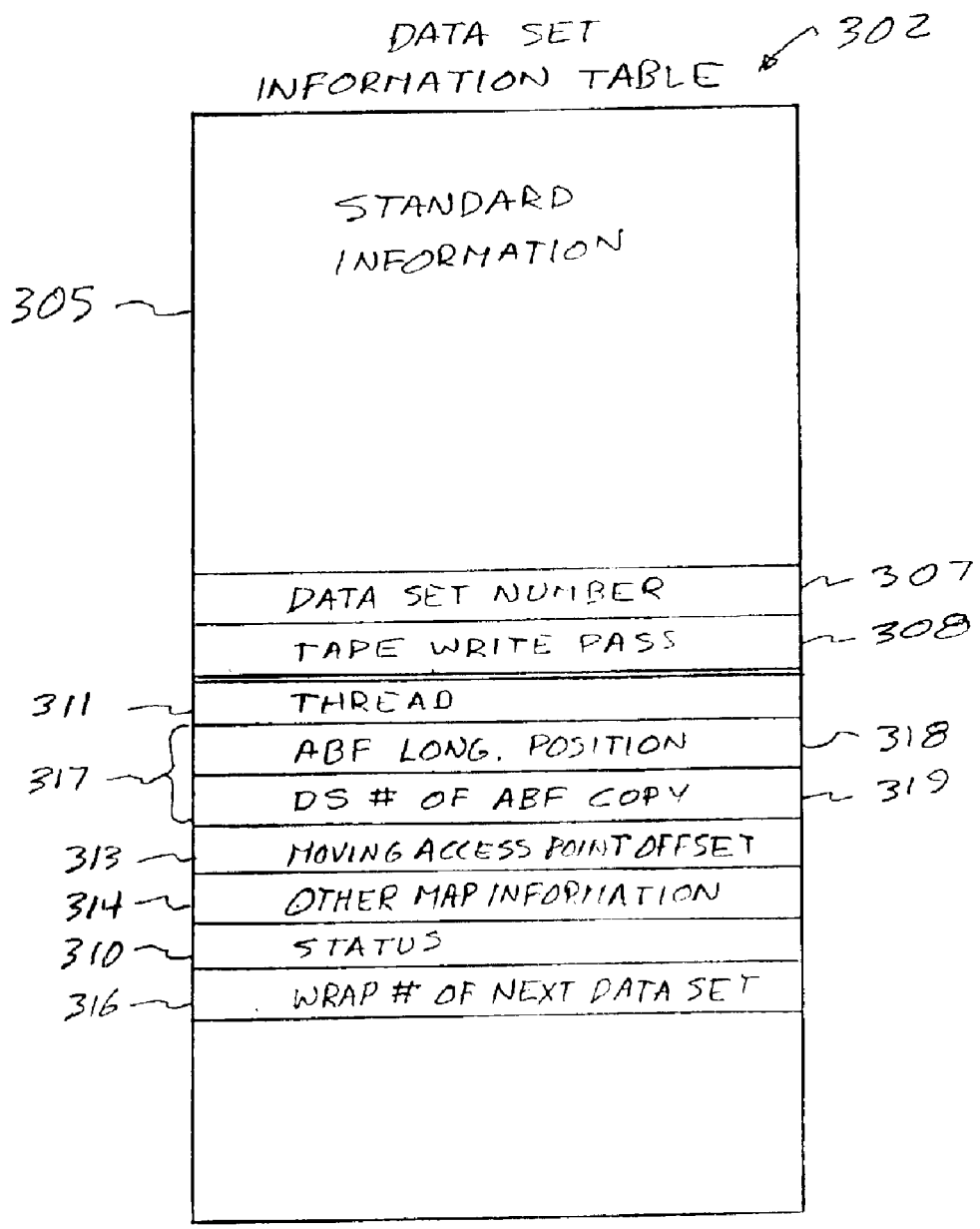
FIG. 13 is a diagrammatic illustration of an embodiment of a data set information table in accordance with the present invention.

An embodiment of a data set information table 302 in accordance with the present invention is illustrated in FIG. 13.

Much of the information in the data set information table is standard information 305. For example, each data set has a Data Set Number 307, which, in one example, is the ordinal number of the data set from the beginning of tape. Other standard information is the Tape Write Pass 308, which is employed as discussed above for synchronized transactions in accordance with the present invention, as the write pass indication "WP" for each data set that may be incremented to indicate that the recursively written transactions are each the most recent copy, superseding the identified separately written synchronized transactions.

In FIG. 13, field 310 of the data set information table, in a portion of the field, identifies the data set as having a synchronized transaction of a detected pattern. If the data set information table were provided in all data sets of the tape, these bits, and much of the remainder of the non-standard fields, may be set to all zero, or "0", in the data sets not having synchronized transactions of a detected pattern.

Field 311 provides a thread for the entire string of data sets of the synchronized transactions of a detected pattern, including work copy synchronized transaction data sets and recursively written synchronized transaction data sets. As one example, the thread for the synchronized transactions of the detected pattern, comprises the write pass number 308 of the last data set having a transaction of the pattern written to the magnetic tape as a normal wrap data set, and before the work copy synchronized transaction data sets are written.

Fields 313 and 314 provide the moving access point for synchronized transaction data sets. Specifically, in the event one of the written synchronized transactions, or the end of a transaction, such as record 50 of FIG. 4, partially fills a data set, such as data set 120, as discussed above, the controller rewrites the partially filled data set in a succeeding data set, such as data set 121. The controller appends a subsequent synchronized transaction, such as record 51 to the rewritten synchronized transaction 50 in the succeeding data set 121 as an appended synchronized transaction.

Referring to FIG. 13, the controller establishes a moving access point for the succeeding data set 121 of FIG. 4 in field 313 of the data set information table 302 of the succeeding data set. The moving access point is an offset, for example, from the beginning of the data set, that identifies the appended synchronized transaction, the new data, and is shown as moving access point 141 in FIG. 4. Thus, in a read recovery process, the process would read record 50 at the access point 140 of data set 120, and would skip the rewritten synchronized transaction 50 in data set 121.

Referring to FIG. 4, in the instance where the transactions comprise compressed information, in a read recovery of the partially filled data set and the succeeding data set, the written synchronized transaction 50 is read and decompressed from the partially filled data set 120, the rewritten synchronized transaction of the succeeding data set is skipped due to the moving access point 141, and the appended synchronized transaction 51 is read and decompressed from the succeeding data set 121. This saves having to read and decompress transactions twice during the recovery process.

Similarly, referring to FIG. 13, the moving access point in field 313 of the data set information table 302 of data set 122 of FIG. 4 comprises an offset shown as moving access point 142.

Specifically, referring to FIG. 4, data set 121, is also partially filled by transactions 50 and 51. Thus, the controller rewrites the synchronized transactions of data set 121 in the succeeding data set 122. The controller appends a subsequent synchronized transaction, such as transaction 52 to the rewritten synchronized transactions 50 and 51 in the succeeding data set 122 as an appended synchronized transaction.

In a read recovery of the partially filled data set and the succeeding data set, the written synchronized transaction 50 is read and decompressed from the partially filled data set 120, transaction 51 is read and decompressed from data set 121 by beginning decompression at the moving access point 141 to skip over rewritten transaction 50, the rewritten synchronized transactions 50 and 51 of the succeeding data set 122 are skipped due to the moving access point 142, and the appended synchronized transaction 52 is read and decompressed from the succeeding data sets 122 and 123. This saves having to read and decompress transactions twice or more during the recovery process.

Field 314 of FIG. 13 represents additional information for the moving access point of field 313, and may comprise the total number of records at the moving access point, the number of file marks, the record count from the moving access point to the end of the transaction or data set, and the file mark count to the end of the transaction or data set.

Field 310 represents the status of the data set. A portion of the field indicates that the data set is a synchronized transaction. The remainder of the field indicates the status of the data set in the sequence of the process for writing the synchronized transactions in a sequence of data sets. In one embodiment of the present invention, certain data sets which represent the last data set before a transition is made to the next sequence of the process are defined in the status field 310.

As discussed above, a data set may be a last data set on the normal wrap before switching to the work copy wraps, may be the last work copy data set on a work copy wrap headed in a first longitudinal direction, may be the last work copy on a second work copy wrap that is headed in the opposite longitudinal direction, or may be the last recursively rewritten data set, such that the process has been completed. Each of these data sets are identified by a specific code in the status field 310 of the data set information table 302.

Thus, a read recovery process easily tracks the progress of the original synchronized transaction process.

Field 316 provides a forward pointer to the wrap of the immediately succeeding data set of the synchronized transactions, if any. Thus, if, as is likely, the immediately succeeding data set is on the same wrap, the read recovery process continues reading in the same direction of the same wrap until the next data set is encountered.

As discussed above, the controller writes the synchronized transactions to work copy wraps of the magnetic tape, likely in the form of spaced apart data sets. Data set information tables are additionally provided for data sets of subsequently recursively written synchronized transactions, which are copies of the synchronized transactions written to the magnetic tape in a sequence of data sets. The controller provides, in the data set information table of each data set, the same information as above, and additionally provides a backwards pointer 317 to a longitudinal position on the magnetic tape of a written work copy data set. As an example, the pointer is provided in fields 318 and 319 to the work copy data set of the next synchronized transaction data set to be recursively written. The data set number 307 of the referenced work copy data set is provided in field 319, and the longitudinal position on the magnetic tape of the referenced data set is provided in field 318. If the same fields are provided in other data set information tables, e.g., for the work copy data sets, they are set to all zero, or "0", in those data sets.

Thus, the thread, the status, and the forward and backwards pointers comprise trails provided by the data set information table 302 for aiding in a read recovery process.

Figure 14:
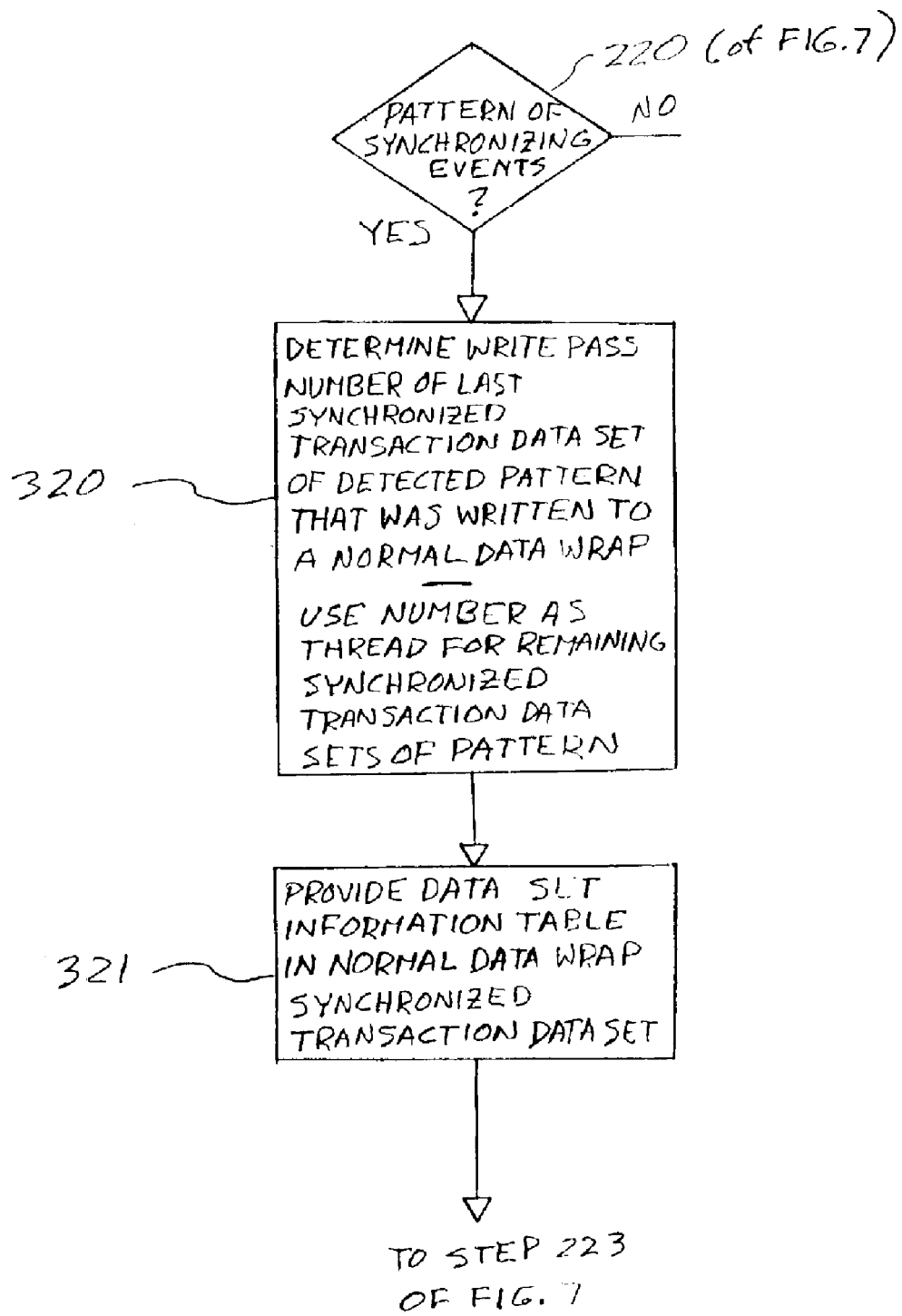
FIG. 14 is a flow chart of an embodiment of additional steps in the flow chart of FIG. 7 to provide information for a data set information table of FIG. 13.

FIG. 14 comprises an embodiment of an addition to the process of FIG. 7 for the purpose of obtaining the thread number for the synchronized data sets, and for providing the data set information table for the last synchronized transaction data set of the detected pattern on the normal wrap before switching to the work copy wraps.

In the illustrated embodiment, after detecting the pattern of synchronizing events of step 220 of FIG. 7, in step 320 of FIG. 14, the controller determines the number representing a thread for the synchronized transactions of the detected pattern. In the example the thread comprises the write pass number of the last data set having a transaction of the pattern written to the magnetic tape as a normal wrap data set, and before the work copy synchronized transaction data sets are written. In FIG. 5, data set 151 is the last normal wrap data set. In step 321 of FIG. 14, the controller provides the data set information table 302 of FIG. 13 for data set 151 of FIG. 5. The process then continues at step 223 of FIG. 7.

Figure 8:
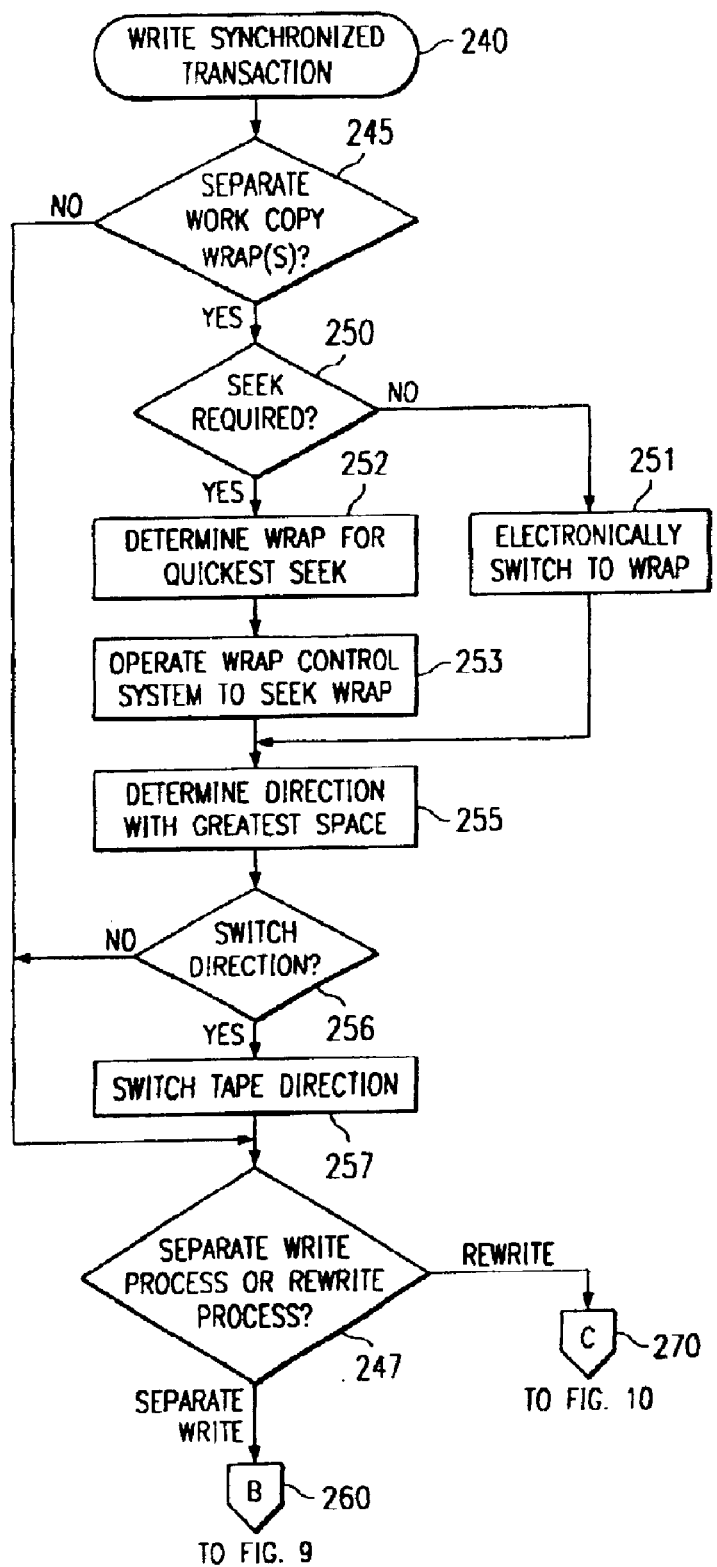
FIG. 8 is a flow chart depicting an embodiment of the method of the present invention for writing the accumulated synchronized data of FIG. 7.
Figure 9:
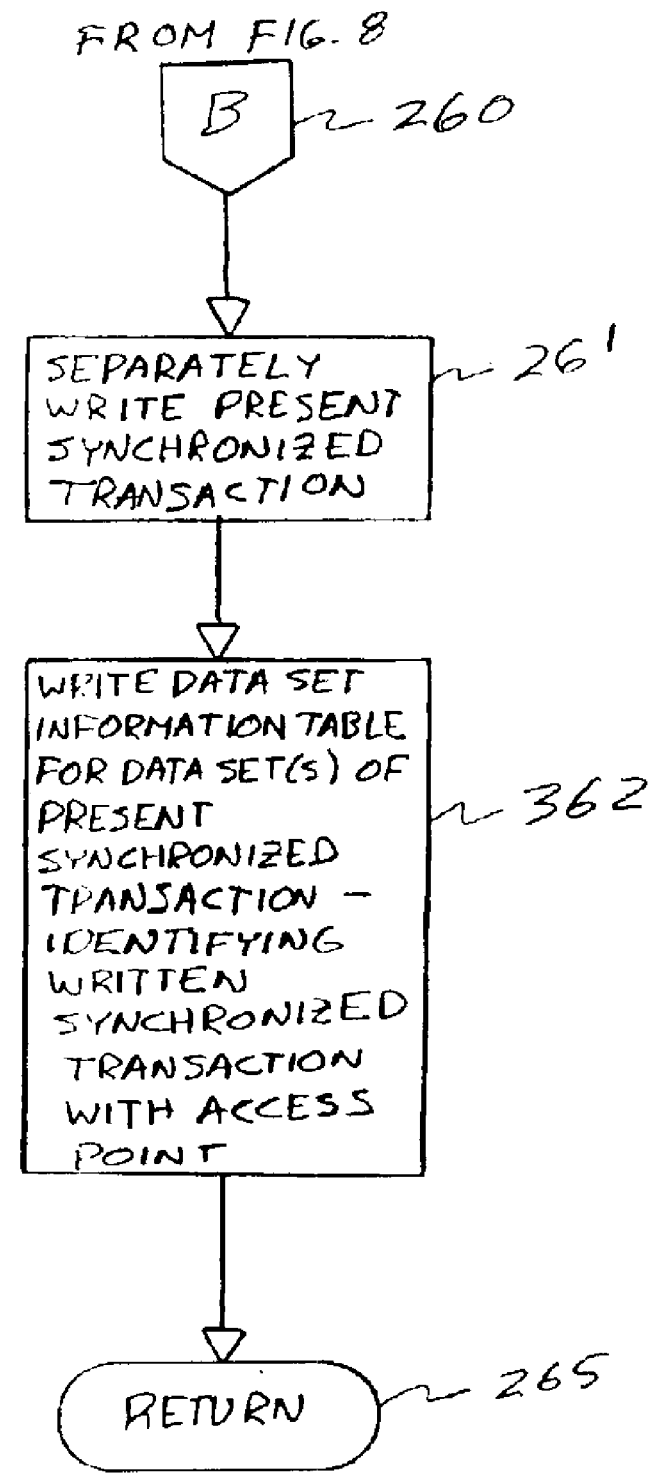
FIG. 9 is a flow chart depicting an embodiment of the method of the present invention for writing the accumulated synchronized data of FIG. 8.
Figure 10:
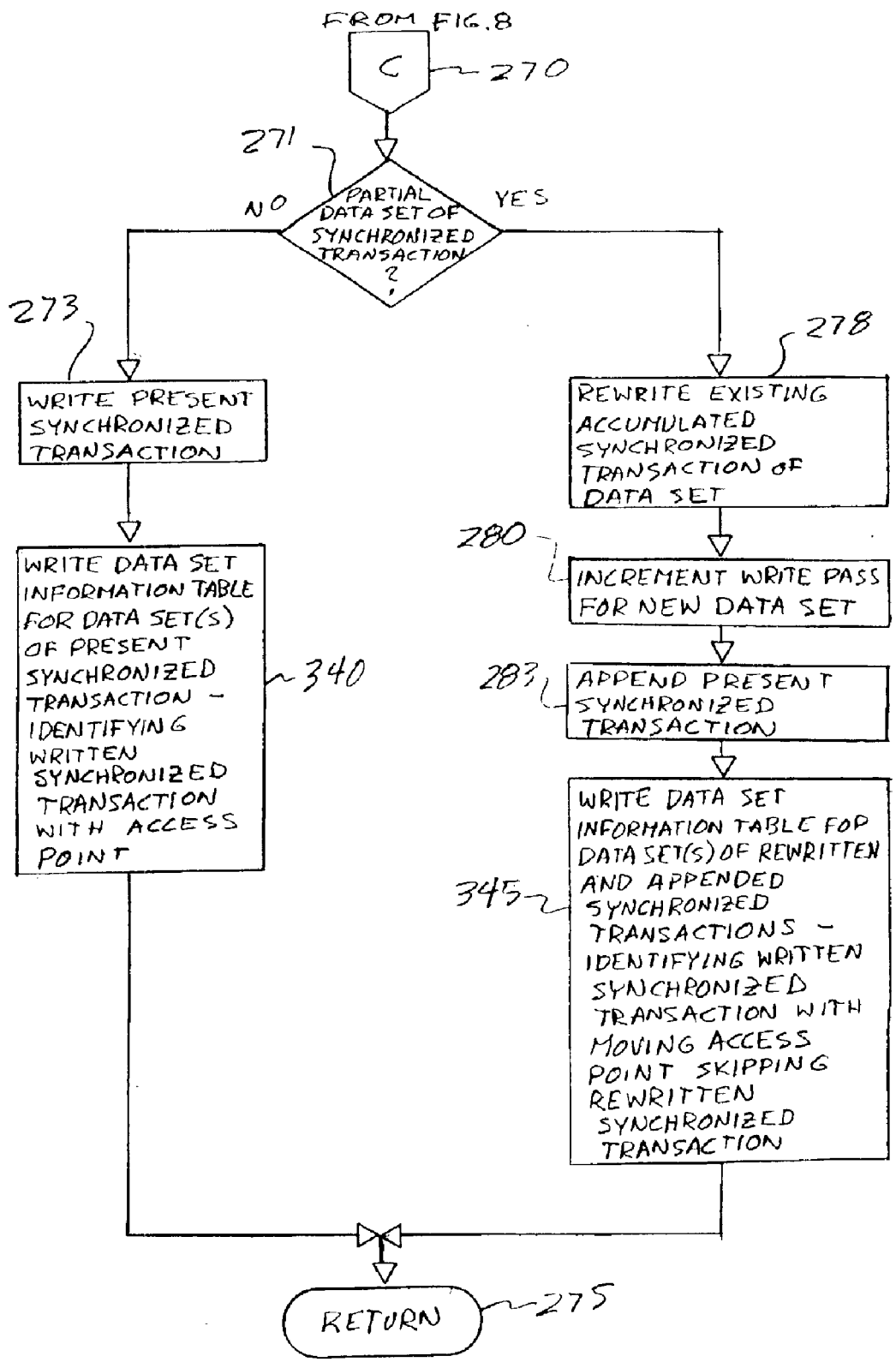
FIG. 10 is a flow chart depicting an alternative embodiment of the method of the present invention for writing the accumulated synchronized data of FIG. 8.

Specific embodiments of step 223 of FIG. 7 are illustrated in FIGS. 8–10, beginning at step 240.

Referring to FIGS. 5 and 8, in step 245, the controller determines whether the magnetic tape comprises a plurality of wraps, such as in an LTO system as discussed above, and whether the work copies are to be written to at least one of the plurality of wraps that is separate from a wrap of the recursive writing. If not, the process proceeds to step 247.

If step 245 determines that accumulating backhitchless wraps, e.g., wraps 180 and 181 of FIG. 5, are to be utilized for work copies, in step 250, as discussed above, the controller operates the wrap control system 27 of FIG. 1 to determine whether access to the work copy wraps requires a seek. If not, the wrap control system, in step 251, electronically switches to a different set of read/write heads. If, in step 250, a seek is required, the controller 18, in step 252, determines the work copy wrap which can be reached by the quickest seek. As discussed above, this may be the closest adjacent available work copy wrap. Then, in step 253, the controller operates the wrap control to conduct the seek and move the head laterally to the selected work copy wrap.

Once the work copy wrap has been selected, the controller, in step 255, as discussed above, determines the writable space of the work copy wrap in each longitudinal direction from the present longitudinal position of the read/write head, and determines the direction having the greatest writable space. In step 256, the controller determines whether the direction having the greatest writable space is the current direction, and, if so, no change of direction is made. If, however, step 256 determines that the tape direction must be switched, the controller, in step 257, operates the motors 25 to switch the direction of tape motion. In the steps following step 247, the work copies 170–171 are then written on the accumulating backhitchless wraps 180 and 181, first in the direction of arrow 185, and then in the direction of arrow 186, as discussed above with respect to FIG. 8.

Step 247 determines whether the work copies are to be written separately or appended to rewritten copies.

If the work copies are to be written separately, connector 260 leads to FIG. 9, and to step 261. In step 261, the work copy of each synchronized transaction, e.g., of transactions 50–53, of the pattern is written separately from the buffer to the magnetic tape, either as illustrated in FIG. 3, as data sets 80–83, or as illustrated in FIG. 4 as data sets 120–123, each as discussed above.

In accordance with the present invention, in step 362, each separately written transaction data set is provided with a data set information table 302 of FIG. 13, and the transaction is identified with an access point. For example, in FIG. 3, each separately written synchronized transaction 50–53 is identified by means of an access point 110–113, and, in FIG. 4, separately written transaction 50 is identified by means of a normal access point 140. In step 265, the process returns to step 225 of FIG. 7.

If step 247 of FIG. 8 determines that the work copies are to be written as appended to rewritten accumulated synchronized transactions, connector 270 leads to FIG. 10, and to step 271.

Step 271 determines whether there is an existing accumulated synchronized transactions of the detected synchronizing event pattern that has only partially filled a data set. If not, the present transaction starts a new data set, and is written in step 273. As an example, the transaction appears as record or records 50 in partial data set 120 of FIG. 4, followed by DSS 130.

In accordance with the present invention, the data set is provided with a data set information table 302 of FIG. 13 in step 340, and the transaction is identified with an access point. In FIG. 4, separately written transaction 50 is identified by means of a normal access point 140.

The process proceeds to step 275 and returns to step 225 of FIG. 7, where the transaction is accumulated to the buffer, and the process ultimately cycles back to step 271 of FIG. 10 with the next synchronized transaction. Although steps 223 and 225 are shown sequentially, both must happen, either simultaneously or in either order.

Step 271 then determines that there is now an existing partial data set with at least one accumulated synchronized transaction, and, in step 278, rewrites the accumulated transaction(s) of the data set, incrementing the write pass indicator for the data set in step 280, and appending the present synchronized transaction to the rewritten accumulated transactions in step 283. Thus, in FIG. 4, the subsequent transaction 51 is appended to the accumulated transaction 50 and the rewritten accumulated transaction 50 and the new synchronized transaction are written as data set 121, followed by DSS 131, and step 275 returns to step 225 of FIG. 7 and transaction 51 is accumulated in the buffer, etc., as discussed above.

The rewritten and appended written synchronized data set is identified as the most current copy thereof in step 280 by means of an incremented write pass "WP", as discussed above.

In accordance with the present invention, the process moves to step 345, and the written synchronized transaction data set is provided with a data set information table 302 of FIG. 13, and the transaction is identified with a moving access point. For example, in FIG. 4, each rewritten synchronized transaction data set 121–122 having an appended synchronized transaction 51–52 is identified by means of a moving access point 141–142, and the rewrites of the accumulated data records are ignored and the write pass indicator is not updated, as discussed above. Instead, the active record is indicated by the moving access point 141–142.

Figure 11:
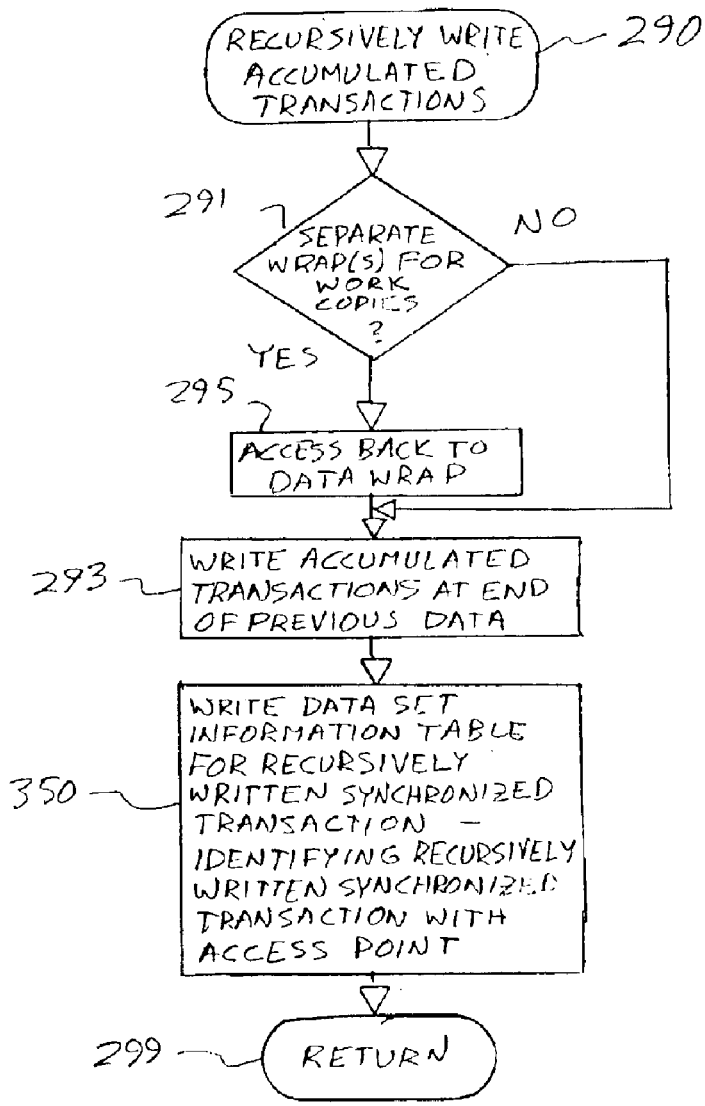
FIG. 11 is a flow chart depicting an embodiment of the method of the present invention for recursively writing the accumulated synchronized data of FIG. 7.

Specific embodiments of step 233 of FIG. 7 are illustrated in FIG. 11, beginning at step 290. Step 291 is similar to step 245 of FIG. 8, and determines whether the work copies have been written to at least one of a plurality of wraps that is separate from any wrap of the recursive writing. If not, the process proceeds to step 293.

If step 291 determines that accumulating backhitchless wraps, e.g., wraps 180 and 181 of FIG. 5, have been utilized, in step 295, as discussed above, the controller operates the wrap control system 27 of FIG. 1 to access the tape head 23 to the standard wrap, either by electronic switching or a seek as above, and the process continues at step 293. In step 293, the wrap control system operates to position the tape head at the end of the previous data at the speed required to write, and the process returns in step 299 to step 233 of FIG. 7 to recursively write the accumulated synchronized transactions from the buffer to the standard wrap 160 immediately after the preceding data 151 in the direction of arrow 161, shown as data sets 190.

In step 350, the recursively written synchronized transaction data set is provided with a data set information table 302 of FIG. 13. Also, the write pass indicators or access points are updated, and the transaction is identified with a moving access point.

The work copies 170–171 may then be overwritten.

As discussed above, in step 233 of FIG. 7, the controller additionally identifies the recursively written transactions as the most current copy thereof, employing in the separately written embodiment of FIG. 3, the access point 115 superseding the identified separately written synchronized data records of the data sets 80–83; in the separately written embodiment of FIG. 4 the access point 148 superseding the identified separately written synchronized data records of the data sets 121–123; and in the rewriting embodiment of FIG. 4, the incrementing the write passes an additional time to, e.g., to "WP3" for data set 145, etc., superseding the identified separately written synchronized transactions of the data sets 121–123.

Again, as the result, should power be lost before the work copies are overwritten, examination of the access points and/or of the write pass indicators will allow a correct recovery to be made.

Figure 15:
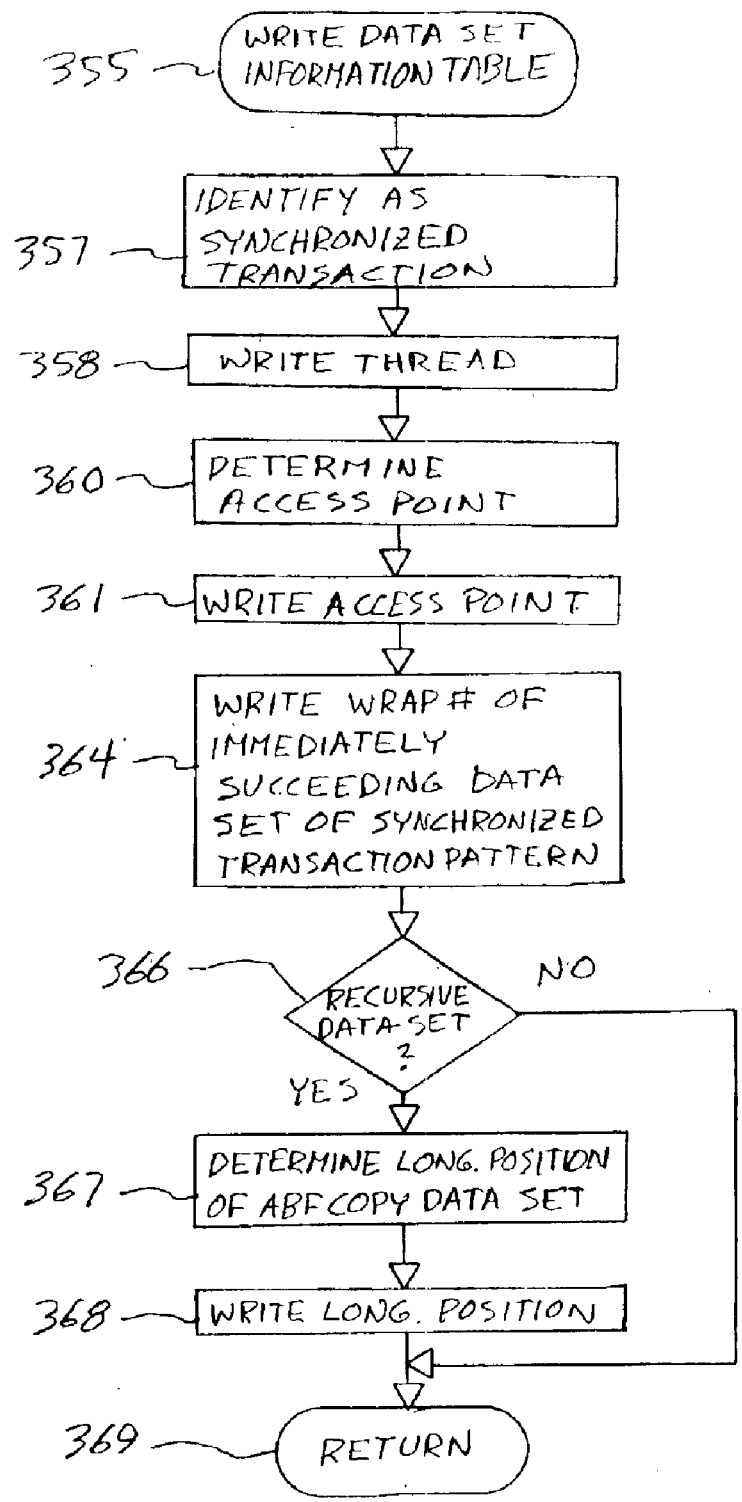
FIG. 15 is a flow chart of an embodiment of the method of the present invention for providing a data set information table of FIG. 13.

An embodiment of the process of writing a data set information table for a synchronized transaction data set is illustrated in FIG. 15, beginning at step 355. In step 357, the data set is identified in field 310 of the data set information table 302 of FIG. 13 as having a synchronized transaction of a detected pattern. Additionally, as discussed above, the remainder of the field indicates the status of the data set in the sequence of the process for writing the synchronized transactions in a sequence of data sets. In one embodiment of the present invention, the identification is of certain data sets which represent the last data set before a transition is made to the next sequence of the process are defined in the status field 310. For example, a data set may be a last data set on the normal wrap before switching to the work copy wraps, may be the last work copy data set on a work copy wrap headed in a first longitudinal direction, may be the last work copy on a second work copy wrap that is headed in the opposite longitudinal direction, or may be the last recursively rewritten data set, such that the process has been completed. Each of these data sets are identified in step 357 by a specific code in the status field 310 of the data set information table 302.

Step 358 writes the thread for the entire string of data sets of the synchronized transactions of a detected pattern, including work copy synchronized transaction data sets and recursively written synchronized transaction data sets. As one example, as discussed above, the thread for the synchronized transactions of the detected pattern, comprises the write pass number 308 of the last data set having a transaction of the pattern written to the magnetic tape as a normal wrap data set, and before the work copy synchronized transaction data sets are written.

Steps 360 and 361 relate to the moving access point of fields 313 and 314 for synchronized transaction data sets. Specifically, in the event one of the written synchronized transactions, such as record 50 of FIG. 4, partially fills a data set, such as data set 120, as discussed above, the controller rewrites the partially filled data set in a succeeding data set, such as data set 121. The controller appends a subsequent synchronized transaction, such as record 51 to the rewritten partially filled succeeding data set 121 as an appended synchronized transaction. Step 360 determines whether a moving access point is required, and, if so, step 361 writes the moving access point for the succeeding data set 121 of FIG. 4 in field 313 of the data set information table 302 of the succeeding data set. The moving access point is an offset, for example, from the beginning of the data set, that identifies the appended synchronized transaction, and is shown as access point 141 in FIG. 4. Thus, in a read recovery process the process would read record 50 at the normal access point 140 of data set 120, and would skip the rewritten synchronized transaction 50 in data set 121. Step 361 additionally writes additional information for the moving access point of field 313, and may comprise the total number of records at the moving access point, the number of file marks, the record count from the moving access point to the end of the transaction or data set, and the file mark count to the end of the transaction or data set.

Step 364 writes a forward pointer in field 316 of the data set information table 302 of FIG. 13. In the example, the forward pointer is to the wrap of the immediately succeeding data set of the synchronized transactions, if any. Thus, if, as is likely, the immediately succeeding data set is on the same wrap, the read recovery process continues reading in the same direction of the same wrap until the next data set is encountered.

Steps 367 and 368 relate to the recursively rewritten data sets. As discussed above, the controller writes the synchronized transactions to work copy wraps of the magnetic tape, likely in the form of spaced apart data sets. The data sets of subsequently recursively written synchronized transactions are copies of the synchronized transactions written to the magnetic tape in a sequence of data sets. Thus, step 366 first determines whether the data set is a recursively rewritten data set, and step 367 determines the backwards pointer 317 of FIG. 13, which is to a longitudinal position on the magnetic tape of a written work copy data set. As an example, the pointer is provided in fields 318 and 319 to the work copy data set of the next synchronized transaction data set to be recursively written. The data set number 307 of the referenced work copy data set is provided in field 319, and the longitudinal position on the magnetic tape of the referenced data set is provided in field 318. If the same fields are provided in other data set information tables, e.g., for the work copy data sets, they are set to all zero, or "0", in those data sets.

The field is then written in step 368 and the process returns to the originating point in step 369.

The full recursive accumulating backhitchless synchronized writing cycle may be considered to have four "corners" at which the status field 310 of FIG. 4 changes. Additionally, other fields provide forward pointers to the location to where the operation continued next, and backwards pointers to the work copies. The thread in field 311 ties together all data sets, working or rewritten, of a given recursive accumulating backhitchless synchronized writing cycle.

Thus, upon a failure requiring a read recovery, the data set information table of the data sets prior to the failure provide a robust set of information allowing the tracing of the data sets and an implementation of the read recovery process to recover the data. The moving access points of field 313 allow the read recovery process to skip rewritten data and to recover the data in an efficient manner.

Those of skill in the art understand that changes may be made in accordance with specific formats in which the invention may be implemented, and in accordance with alternative locations of the work copies of synchronized data records. Further, those of skill in the art understand that various tape drives, and tape cartridges may be employed, having differing specific component arrangements than that illustrated herein.

While the preferred embodiments of the present invention have been illustrated in detail, it should be apparent that modifications and adaptations to those embodiments may occur to one skilled in the art without departing from the scope of the present invention as set forth in the following claims.

We claim:

1. A recording system for a magnetic tape drive, said magnetic tape drive having at least one motor for moving a magnetic tape longitudinally; said magnetic tape drive having at least one read/write head for reading from and for writing to said magnetic tape while said magnetic tape is moved longitudinally by said at least one motor; said magnetic tape drive for receiving data to be written to said magnetic tape, said recording system comprising:

at least one recording channel receiving said data to be written to said magnetic tape, said data in the form of transactions, and said at least one recording channel for operating said at least one read/write head for writing transactions to said magnetic tape; and a controller operating said at least one motor, and said at least one recording channel, said controller:

detects a pattern of synchronizing events for writing said transactions to said magnetic tape as synchronized transactions;

writes said synchronized transactions to said magnetic tape as written synchronized transactions, in the form of data sets, each data set having a data set information table;

in the event one of said written synchronized transactions partially fills a data set, rewrites said partially filled data set in a succeeding data set, appends a subsequent said synchronized transaction in said succeeding data set as an appended synchronized transaction; and establishes a moving access point for said succeeding data set in said data set information table of said succeeding data set, said moving access point identifying said appended synchronized transaction, thereby skipping said rewritten synchronized transaction.

2. The recording system of claim 1, wherein said transactions comprise compressed information, and said provided data set information tables comprise uncompressed information, such that, in a read recovery of said partially filled data set and said succeeding data set, said written synchronized transaction is read and decompressed from said partially filled data set, said rewritten synchronized transaction of said succeeding data set is skipped, and said appended synchronized transaction is read and decompressed from said succeeding data set.

3. A recording system for a magnetic tape drive, said magnetic tape drive having at least one motor for moving a magnetic tape longitudinally, said magnetic tape having a plurality of wraps; said magnetic tape drive having at least one read/write head for reading from and for writing to said magnetic tape while said magnetic tape is moved longitudinally by said at least one motor; said magnetic tape drive for receiving data to be written to said magnetic tape, said recording system comprising:

at least one recording channel receiving said data to be written to said magnetic tape, said data in the form of transactions, said at least one recording channel for operating said at least one read/write head for writing transactions to said magnetic tape at said plurality of wraps; and a controller operating said at least one motor, and said at least one recording channel, said controller:

detects a pattern of synchronizing events for writing said transactions to said magnetic tape as synchronized transactions;

writes said synchronized transactions to at least one of said plurality of wraps of said magnetic tape as synchronized transactions, in the form of data sets, each data set having a data set information table;

provides, in said data set information table of each data set for said synchronized transactions, a number representing a thread for said synchronized transactions of said detected pattern;

provides, in said data set information table of each data set of said synchronized transactions, the status of said data set; and provides, in said data set information table of each data set of said synchronized transactions, an identification of the wrap of the immediately succeeding data set of said synchronized transactions, if any.

4. A recording system for a magnetic tape drive, said magnetic tape drive having at least one motor for moving a magnetic tape longitudinally, said magnetic tape having a plurality of wraps; said magnetic tape drive having at least one read/write head for reading from and for writing to said magnetic tape while said magnetic tape is moved longitudinally by said at least one motor; said magnetic tape drive for receiving data to be written to said magnetic tape, said recording system comprising:

at least one recording channel receiving said data to be written to said magnetic tape, said data in the form of transactions, and said at least one recording channel for operating said at least one read/write head for writing transactions to said magnetic tape at said plurality of wraps; and a controller operating said at least one motor, and said at least one recording channel, said controller:

detects a pattern of synchronizing events for writing said transactions to said magnetic tape as synchronized transactions;

writes said synchronized transactions to at least one of said plurality of wraps of said magnetic tape, in the form of work copy data sets, each work copy data set having a data set information table;

subsequently recursively writes said synchronized transactions to said magnetic tape in a sequence, in the form of data sets, each data set having a data set information table;

provides, in said data set information table of each said data set, a number representing a thread for said synchronized transactions of said detected pattern;

provides, in said data set information table of each said data set, the status of said data set;

provides, in said data set information table of each said data set, an identification of the wrap of the immediately succeeding said data set, if any; and provides, in said data set information table of each said recursively written synchronized transaction data set, a backwards pointer to a longitudinal position on said magnetic tape of a work copy data set.

5. The recording system of claim 4, wherein said controller, provides said status of each said data set, identifying in said status, the last data set of said synchronized transactions written to a wrap of said magnetic tape; identifying in said status, the last data set of said synchronized transactions written to said plurality of wraps of said magnetic tape; and identifying in said status, the last data set of said synchronized transactions subsequently recursively written to said magnetic tape.

6. The recording system of claim 5, wherein said controller initially writes at least one data set of said synchronized transactions of said pattern to said magnetic tape as a normal wrap data set before switching to a work copy wrap, said data set having a data set information table, and wherein said controller additionally provides said status of said normal wrap data set in said data set information table, identifying in said status, the last said normal wrap data set; and wherein said a number representing a thread for said synchronized transactions of said detected pattern, comprises the write pass number of the last data set having a transaction of said pattern written to said magnetic tape as a normal wrap data set, and before said synchronized transaction data sets are written.

7. A recording system for a magnetic tape drive, said magnetic tape drive having at least one motor for moving a magnetic tape longitudinally, said magnetic tape having a plurality of wraps; said magnetic tape drive having at least one read/write head for reading from and for writing to said magnetic tape while said magnetic tape is moved longitudinally by said at least one motor; said magnetic tape drive for receiving data to be written to said magnetic tape, said recording system comprising:

at least one recording channel receiving said data to be written to said magnetic tape, said data in the form of transactions, and said at least one recording channel for operating said at least one read/write head for writing transactions to said magnetic tape at said plurality of wraps; and a controller operating said at least one motor, and said at least one recording channel, said controller:

detects a pattern of synchronizing events for writing said transactions to said magnetic tape as synchronized transactions;

writes said synchronized transactions to at least one of said plurality of wraps of said magnetic tape as written synchronized transactions, in the form of data sets, each data set having a data set information table;

in the event one of said written synchronized transactions partially fills a data set, rewrites said synchronized transaction of said data set in a succeeding data set, appends a subsequent said synchronized transaction in said succeeding data set as an appended synchronized transaction; and establishes a moving access point for said succeeding data set in said data set information table of said succeeding data set, said moving access point identifying said appended synchronized transaction, thereby skipping said rewritten synchronized transaction;

provides, in said data set information table of each said data set for said synchronized transactions, a number representing a thread for said synchronized transactions of said detected pattern;

provides, in said data set information table of each data set for said synchronized transactions, the status of said data set; and provides, in said data set information table of each data set for said synchronized transactions, an identification of the wrap of the immediately succeeding data set of said synchronized transactions, if any.

8. A magnetic tape drive, comprising:

at least one motor for moving a magnetic tape longitudinally;

at least one read/write head for reading from and for writing to said magnetic tape while said magnetic tape is moved longitudinally by said at least one motor;

at least one recording channel for receiving data to be written to magnetic tape, said data in the form of transactions, said at least one recording channel for operating said at least one read/write head for writing transactions to said magnetic tape; and a controller operating said at least one motor, and said at least one recording channel, said controller:

detects a pattern of synchronizing events for writing said transactions to said magnetic tape as synchronized transactions;

operates said at least one read/write head to access said magnetic tape and to write said synchronized transactions to said magnetic tape as written synchronized transactions, in the form of data sets, each data set having a data set information table;

in the event one of said written synchronized transactions partially fills a data set, rewrites said written synchronized transaction of said data set in a succeeding data set, appends a subsequent said synchronized transaction in said succeeding data set as an appended synchronized transaction; and establishes a moving access point for said succeeding data set in said data set information table of said succeeding data set, said moving access point identifying said appended synchronized transaction, thereby skipping said rewritten synchronized transaction.

9. The magnetic tape drive of claim 8, wherein said transactions comprise compressed information, and said provided data set information tables comprise uncompressed information, such that, in a read recovery of said partially filled data set and said succeeding data set, said written synchronized transaction is read and decompressed from said partially filled data set, said rewritten synchronized transaction of said succeeding data set is skipped, and said appended synchronized transaction is read and decompressed from said succeeding data set.

10. A magnetic tape drive, comprising:
at least one motor for moving a magnetic tape longitudinally, said magnetic tape comprising a plurality of wraps;
at least one read/write head for reading from and for writing to said magnetic tape while said magnetic tape is moved longitudinally by said at least one motor;
a wrap control system for accessing said wraps of said magnetic tape with said at least one read/write head;
at least one recording channel for receiving data to be written to said magnetic tape, said data in the form of transactions, said at least one recording channel for operating said at least one read/write head for writing transactions to said magnetic tape; and
a controller operating said at least one motor, said wrap control system, and said at least one recording channel, said controller:
detects a pattern of synchronizing events for writing said transactions to said magnetic tape as synchronized transactions;
operates said wrap control system and said at least one read/write head to access at least one work copy wrap of said magnetic tape and to write said synchronized transactions of said detected pattern to said at least one work copy wrap of said magnetic tape, in the form of data sets, each data set having a data set information table;
provides, in said data set information table of each data set for said synchronized transactions, a number representing a thread for said synchronized transactions of said detected pattern;
provides, in said data set information table of each data set of said synchronized transactions, the status of said data set; and
provides, in said data set information table of each data set of said synchronized transactions, an identification of the wrap of the immediately succeeding data set of said synchronized transactions, if any.

11. A magnetic tape drive, comprising:
at least one motor for moving a magnetic tape longitudinally, said magnetic tape comprising a plurality of wraps;
at least one read/write head for reading from and for writing to said magnetic tape while said magnetic tape is moved longitudinally by said at least one motor;
a wrap control system for accessing said wraps of said magnetic tape with said at least one read/write head;
at least one recording channel for receiving data to be written to said magnetic tape, said data in the form of transactions, said at least one recording channel for operating said at least one read/write head for writing transactions to said magnetic tape; and
a controller operating said at least one motor, said wrap control system, and said at least one recording channel, said controller:
detects a pattern of synchronizing events for writing said transactions to said magnetic tape as synchronized transactions;
operates said wrap control system and said at least one read/write head to access at least one work copy wrap of said magnetic tape and to write said synchronized transactions of said detected pattern to said at least one work copy wrap of said magnetic tape, in the form of data sets, each data set having a data set information table;
subsequently operates said wrap control system and said at least one read/write head to access at least one normal wrap separate from said at least one work copy wrap, and to recursively write said synchronized transactions to said at least one normal wrap of said magnetic tape in a sequence, in the form of data sets, each data set having a data set information table;
provides, in said data set information table of each said data set, a number representing a thread for said synchronized transactions of said detected pattern;
provides, in said data set information table of each said data set, the status of said data set;
provides, in said data set information table of each said data set, an identification of the wrap of the immediately succeeding said data set, if any; and
provides, in said data set information table of each said recursively written synchronized transaction data set, a backwards pointer to a longitudinal position on said magnetic tape of a work copy data set.

12. The magnetic tape drive of claim 11, wherein said controller, provides said status of each said data set, identifying in said status, the last data set of said synchronized transactions written to a wrap of said magnetic tape; identifying in said status, the last data set of said synchronized transactions written to said plurality of wraps of said magnetic tape; and identifying in said status, the last data set of said synchronized transactions subsequently recursively written to said magnetic tape.

13. The magnetic tape drive of claim 12, wherein said controller initially writes at least one data set of said synchronized transactions of said pattern to said magnetic tape as a normal wrap data set before switching to a work copy wrap, said data set having a data set information table, and wherein said controller additionally provides said status of said normal wrap data set in said data set information table, identifying in said status, the last said normal wrap data set; and wherein said a number representing a thread for said synchronized transactions of said detected pattern, comprises the write pass number of the last data set having a transaction of said pattern written to said magnetic tape as a normal wrap data set, and before said synchronized transaction data sets are written.

14. A magnetic tape drive, comprising:
at least one motor for moving a magnetic tape longitudinally, said magnetic tape comprising a plurality of wraps;
at least one read/write head for reading from and for writing to said magnetic tape while said magnetic tape is moved longitudinally by said at least one motor;
a wrap control system for accessing said wraps of said magnetic tape with said at least one read/write head;

at least one recording channel for receiving data to be written to said magnetic tape, said data in the form of transactions, said at least one recording channel for operating said at least one read/write head for writing transactions to said magnetic tape; and a controller operating said at least one motor, said wrap control system, and said at least one recording channel, said controller:

detects a pattern of synchronizing events for writing said transactions to said magnetic tape as synchronized transactions;

operates said wrap control system and said at least one read/write head to access at least one work copy wrap of said magnetic tape and to write said synchronized transactions of said detected pattern to said at least one work copy wrap of said magnetic tape as written synchronized transactions, in the form of data sets, each data set having a data set information table;

in the event one of said written synchronized transactions partially fills a data set, rewrites said written synchronized transaction of said data set in a succeeding data set, appends a subsequent said synchronized transaction in said succeeding data set as an appended synchronized transaction; and establishes a moving access point for said succeeding data set in said data set information table of said succeeding data set, said moving access point identifying said appended synchronized transaction, thereby skipping said rewritten synchronized transaction;

provides, in said data set information table of each said data set for said synchronized transactions, a number representing a thread for said synchronized transactions of said detected pattern;

provides, in said data set information table of each data set for said synchronized transactions, the status of said data set; and provides, in said data set information table of each data set for said synchronized transactions, an identification of the wrap of the immediately succeeding data set of said synchronized transactions, if any.

15. A method for writing received synchronized data to magnetic tape, in a magnetic tape drive having at least one motor for moving said magnetic tape longitudinally, having at least one read/write head for reading from and for writing to said magnetic tape while said magnetic tape is moved longitudinally by said at least one motor, and having at least one recording channel for operating said at least one read/write head for writing data to said magnetic tape, said data in the form of transactions, said method comprising the steps of:

detecting a pattern of synchronizing events for writing said transactions to said magnetic tape as synchronized transactions;

writing said synchronized transactions to said magnetic tape as written synchronized transactions, in the form of data sets, each data set having a data set information table;

in the event one of said written synchronized transactions partially fills a data set, rewriting said synchronized transaction of said data set in a succeeding data set, appending a subsequent said synchronized transaction in said succeeding data set as an appended synchronized transaction; and establishing a moving access point for said succeeding data set in said data set information table of said succeeding data set, said moving access point identifying said appended synchronized transaction, thereby skipping said rewritten synchronized transaction.

16. The method of claim 15, wherein said transactions comprise compressed information, and said provided data set information tables comprise uncompressed information, such that, in a read recovery of said partially filled data set and said succeeding data set, said written synchronized transaction is read and decompressed from said partially filled data set, said rewritten synchronized transaction of said succeeding data set is skipped, and said appended synchronized transaction is read and decompressed from said succeeding data set.

17. A method for writing received synchronized data to magnetic tape, said magnetic tape comprising a plurality of wraps, in a magnetic tape drive having at least one motor for moving said magnetic tape longitudinally, having at least one read/write head for reading from and for writing to said magnetic tape while said magnetic tape is moved longitudinally by said at least one motor, having a wrap control system for accessing said wraps of said magnetic tape with said at least one read/write head, and having at least one recording channel for operating said at least one read/write head for writing data to said magnetic tape, said data in the form of transactions, said method comprising the steps of:

detecting a pattern of synchronizing events for writing said transactions to said magnetic tape as synchronized transactions;

accessing at least one work copy wrap of said magnetic tape with said at least one read/write head;

writing said synchronized transactions of said detected pattern to said at least one work copy wrap of said magnetic tape, in the form of data sets, each data set having a data set information table;

providing, in said data set information table of each said data set, a number representing a thread for said synchronized transactions of said detected pattern;

providing, in said data set information table of each said data set, the status of said data set; and providing, in said data set information table of each said data set, an identification of the wrap of the immediately succeeding said data set, if any.

18. A method for writing received synchronized data to magnetic tape, said magnetic tape comprising a plurality of wraps, in a magnetic tape drive having at least one motor for moving said magnetic tape longitudinally, having at least one read/write head for reading from and for writing to said magnetic tape while said magnetic tape is moved longitudinally by said at least one motor, having a wrap control system for accessing said wraps of said magnetic tape with said at least one read/write head, and having at least one recording channel for operating said at least one read/write head for writing data to said magnetic tape, said data in the form of transactions, said method comprising the steps of:

detecting a pattern of synchronizing events for writing said transactions to said magnetic tape as synchronized transactions;

accessing at least one work copy wrap of said magnetic tape with said at least one read/write head;

writing said synchronized transactions of said detected pattern to said at least one work copy wrap of said magnetic tape, in the form of data sets, each data set having a data set information table;

subsequently accessing at least one normal wrap of said magnetic tape separate from said at least one work copy wrap;

recursively writing said synchronized transactions to said at least one normal wrap of said magnetic tape in a sequence, in the form of data sets, each data set having a data set information table;

providing, in said data set information table of each said data set, a number representing a thread for said synchronized transactions of said detected pattern;

providing, in said data set information table of each said data set, the status of said data set;

providing, in said data set information table of each said data set, an identification of the wrap of the immediately succeeding said data set, if any; and providing, in said data set information table of each said recursively written synchronized transaction data set, a backwards pointer to a longitudinal position on said magnetic tape of a work copy data set.

19. The method of claim 18, wherein said step of providing said status of each said data set, comprises identifying in said status, the last data set of said synchronized transactions written to a wrap of said magnetic tape; identifying in said status, the last data set of said synchronized transactions written to said plurality of wraps of said magnetic tape; and identifying in said status, the last data set of said synchronized transactions subsequently recursively written to said magnetic tape.

20. The method of claim 19, additionally comprising the steps of:

initially writing at least one data set of said synchronized transactions of said pattern to said magnetic tape as a normal wrap data set before switching to a work copy wrap, said data set having a data set information table; and providing said status of said normal wrap data set in said data set information table, identifying in said status, the last said normal wrap data set; and wherein said step of providing a number representing a thread for said synchronized transactions of said detected pattern, comprises providing the write pass number of the last data set having a transaction of said pattern written to said magnetic tape as a normal wrap data set, and before said synchronized transaction data sets are written.

21. A method for writing received synchronized data to magnetic tape, said magnetic tape comprising a plurality of wraps, in a magnetic tape drive having at least one motor for moving said magnetic tape longitudinally, having at least one read/write head for reading from and for writing to said magnetic tape while said magnetic tape is moved longitudinally by said at least one motor, having a wrap control system for accessing said wraps of said magnetic tape with said at least one read/write head, and having at least one recording channel for operating said at least one read/write head for writing data to said magnetic tape, said data in the form of transactions, said method comprising the steps of:

detecting a pattern of synchronizing events for writing said transactions to said magnetic tape as synchronized transactions;

accessing at least one work copy wrap of said magnetic tape with said at least one read/write head;

writing said synchronized transactions to said at least one work copy wrap of said magnetic tape as written synchronized transactions, in the form of data sets, each data set having a data set information table;

in the event one of said written synchronized transactions partially fills a data set, rewriting said synchronized transaction of said data set in a succeeding data set, appending a subsequent said synchronized transaction in said succeeding data set as an appended synchronized transaction; and establishing a moving access point for said succeeding data set in said data set information table of said succeeding data set, said moving access point identifying said appended synchronized transaction, thereby skipping said rewritten synchronized transaction;

providing, in said data set information table of each said data set, a number representing a thread for said synchronized transactions of said detected pattern;

providing, in said data set information table of each said data set, the status of said data set; and providing, in said data set information table of each said data set, an identification of the wrap of the immediately succeeding said data set, if any.

* * * * *